US012666446B2

(12) United States Patent (10) Patent No.: US 12,666,446 B2
Zheng et al. (45) Date of Patent: Jun. 23, 2026

(54) METHOD AND APPARATUS FOR RESOURCE COORDINATION BETWEEN VEHICLE-TO-EVERYTHING DEVICES AND USER EQUIPMENT

(71) Applicant: DATANG GOHIGH INTELLIGENT AND CONNECTED TECHNOLOGY (CHONGQING) CO., LTD., Chongqing (CN)

(72) Inventors: Shilei Zheng, Chongqing (CN); Rui Zhao, Chongqing (CN); Yakun Wang, Chongqing (CN); Tianjun Shen, Chongqing (CN); Chenxin Li, Chongqing (CN)

(73) Assignee: DATANG GOHIGH INTELLIGENT AND CONNECTED TECHNOLOGY (CHONGQING) CO., LTD., Chongqing (CN)

( * ) Notice: Subject to any disclaimer, the term of this patent is extended or adjusted under 35 U.S.C. 154(b) by 0 days.

(21) Appl. No.: 18/476,642

(22) Filed: Sep. 28, 2023

(65) Prior Publication Data

US 2024/0023140 A1 Jan. 18, 2024

Related U.S. Application Data

(63) Continuation of application No. PCT/CN2022/087646, filed on Apr. 19, 2022.

(30) Foreign Application Priority Data

May 10, 2021 (CN) .......................... 202110507886.9

(51) Int. Cl.
H04W 72/25 (2023.01)
H04L 1/1607 (2023.01)
(Continued)

(52) U.S. Cl.
CPC ........... *H04W 72/25* (2023.01); *H04L 1/1812* (2013.01); *H04W 72/02* (2013.01); *H04W 72/563* (2023.01); *H04L 1/1671* (2013.01)

(58) Field of Classification Search
CPC ... H04W 72/25; H04W 72/02; H04W 72/563; H04W 72/40; H04W 72/51; H04W 72/56;
(Continued)

(56) References Cited

U.S. PATENT DOCUMENTS

| 12,245,199 | B2 * | 3/2025 | Hui ........................ H04W 72/02 |
| 12,245,253 | B2 * | 3/2025 | Ye .......................... H04W 72/20 |

(Continued)

FOREIGN PATENT DOCUMENTS

| AU | 2009279494 A1 * | 2/2011 | ........... H04L 1/1657 |
| CN | 110740522 A | 1/2020 | |

(Continued)

OTHER PUBLICATIONS

International Search Report issued in corresponding PCT Application No. PCT/CN2022/087646, dated Jun. 28, 2022.
(Continued)

*Primary Examiner* — Oussama Roudani
(74) *Attorney, Agent, or Firm* — Westbridge IP LLC

(57) ABSTRACT

Disclosed are a method and an apparatus for resource coordination between vehicle-to-everything devices, and a user equipment. The method includes: receiving SCI sent by at least one second user equipment, where the SCI includes indication information for triggering resource coordination; and sending coordination information to a target second user equipment, where the coordination information is used to instruct the target second user equipment to perform resource reselection, and the target second user equipment is at least one of the second user equipments.

14 Claims, 6 Drawing Sheets

(51) Int. Cl.
*H04L 1/1812* (2023.01)
*H04W 72/02* (2009.01)
*H04W 72/563* (2023.01)

(58) Field of Classification Search
CPC ....... H04W 92/18; H04W 4/40; H04W 76/14; H04W 72/0446; H04W 72/0453; H04W 72/566; H04L 1/1812; H04L 1/1671
See application file for complete search history.

(56) References Cited

U.S. PATENT DOCUMENTS

| | | | | |
|---|---|---|---|---|
| 12,262,370 | B2 * | 3/2025 | Lee | H04W 72/1263 |
| 2019/0098617 | A1 | 3/2019 | Li et al. | |
| 2019/0387377 | A1 | 12/2019 | Zhang et al. | |
| 2020/0112400 | A1 | 4/2020 | Lee et al. | |
| 2022/0159752 | A1 * | 5/2022 | Farag | H04W 76/14 |
| 2022/0240265 | A1 * | 7/2022 | Sarkis | H04L 5/0037 |
| 2022/0361147 | A1 * | 11/2022 | Sarkis | H04W 72/0446 |
| 2023/0189293 | A1 * | 6/2023 | Du | H04W 72/25 370/329 |
| 2023/0262737 | A1 | 8/2023 | Wang et al. | |
| 2023/0309134 | A1 * | 9/2023 | Leon Calvo | H04W 72/563 |
| 2023/0362739 | A1 * | 11/2023 | Zhao | H04W 72/25 |
| 2024/0155654 | A1 * | 5/2024 | Panteleev | H04L 5/0037 |
| 2024/0172215 | A1 * | 5/2024 | Matsumura | H04W 72/1263 |
| 2024/0389127 | A1 * | 11/2024 | Mu | H04W 72/1273 |

FOREIGN PATENT DOCUMENTS

| | | | | | |
|---|---|---|---|---|---|
| CN | 110972290 | A | | 4/2020 | |
| CN | 111937463 | A | | 11/2020 | |
| CN | 112235765 | A | | 1/2021 | |
| CN | 112291743 | A | | 1/2021 | |
| CN | 112333661 | A | | 2/2021 | |
| JP | 2023530032 | A | | 7/2023 | |
| KR | 20230044427 | | * | 8/2020 | H04W 4/06 |
| KR | 102626617 | | * | 1/2021 | H04W 72/54 |
| MX | 2019002663 | A | | 7/2019 | |
| WO | 2018174661 | A1 | | 9/2018 | |
| WO | 2019195138 | A1 | | 10/2019 | |
| WO | 2021029717 | A1 | | 2/2021 | |
| WO | WO-2021159278 | A1 | * | 8/2021 | H04L 1/08 |
| WO | 2021234545 | A1 | | 11/2021 | |
| WO | 2022019714 | A1 | | 1/2022 | |
| WO | WO-2022205339 | A1 | * | 10/2022 | H04L 1/0026 |

OTHER PUBLICATIONS

Catt, Gohigh, Discussion on inter-UE coordination in Mode 2 enhancements, R1-2102607, 3GPP TSG RAN WG1 meeting #104b-e, dated Apr. 7, 2021.

Extended European Search Report issued in counterpart European Patent Application No. 22806435.8, dated Aug. 27, 2024.

Fujitsu, Discussion and Decision on Considerations on Inter-UE Coordination for Mode 2 Enhancements, R1-2102720, 3GPP TSG RAN WG1 Meeting #104b-e, dated Apr. 20, 2021.

Futurewei, Discussion on techniques for inter-UE coordination, R1-2102781, 3GPP TSG RAN WG1 Meeting #104-bis-e, dated Apr. 6, 2021.

Huawei, HiSilicon, Discussion and Decision on Inter-UE coordination in sidelink resource allocation, R1-2005255, 3GPP TSG RAN WG1 Meeting #102-e, dated Aug. 8, 2020.

Huawei, HiSilicon, Discussion and Decision on Inter-UE coordination in sidelink resource allocation, R1-2100206, 3GPP TSG RAN WG1 Meeting #104-e, dated Jan. 19, 2021.

Kyocera, Discussion and decision on Inter-UE Coordination for Mode 2, R1-2007771, 3GPP TSG-RAN WG1#103e, dated Nov. 2, 2020.

Lenovo, Motorola Mobility, Discussion on inter-UE coordination for Mode 2 enhancements, R1-2103549, 3GPP TSG RAN WG1 #104b-e, dated Apr. 7, 2021.

LG Electronics, Discussion and information on Feature lead summary for AI 8.11.2.2 Feasibility and benefits for mode 2 enhancements, R1-200xxxx, 3GPP TSG RAN WG1 #103-e, dated Nov. 11, 2020.

MediaTek Inc., Discussion on Mode 2 enhancements, R1-2102690, 3GPP TSG RAN WG1 #104b-e, dated Apr. 7, 2021.

Notice of Reasons for Refusal issued in counterpart Japanese Patent Application No. 2023-562796, dated Nov. 5, 2024.

OPPO, Discussion and Decision on FL summary for AI 8.11.1.1—resource allocation for power saving (1st check point), R1-2104090, 3GPP TSG RAN WG1 #104b-e, dated Apr. 21, 2021.

OPPO, Discussion and Decision on Inter-UE coordination in mode 2 of NR sidelink, R1-2100142, 3GPP TSG RAN WG1 #104-e, dated Jan. 18, 2021.

Spreadtrum Communications, Discussion on inter-UE coordination in sidelink resource allocation, R1-2102468, 3GPP TSG RAN WG1 #104b-e, dated Apr. 7, 2021.

LG Electronics, Discussion on inter-UE coordination for Mode 2 enhancements, R1-2103379, 3GPP TSG RAN WG1 Meeting #104bis-e, dated Apr. 7, 2021.

Office Action issued in counterpart European Patent Application No. EP 22806435.8, dated Jul. 7, 2025.

Panasonic, Inter-UE coordination for Mode 2 enhancements, R1-2103605, 3GPP TSG RAN WG1 #104b-e, dated Apr. 6, 2021.

Huawei et al., Inter-UE coordination in sidelink resource allocation, R1-2101941, 3GPP TSG RAN WG1 Meeting #104-e, dated Jan. 29, 2021.

Intel Corporation, Inter-UE coordination solutions for sidelink resource allocation mode-2, R1-2103049, 3GPP TSG RAN WG1 #104b-e, dated Apr. 7, 2021.

Request for the Submission of an Opinion issued in counterpart Korean Patent Application No. KR 10-2023-7035005, dated May 7, 2026.

* cited by examiner

1

METHOD AND APPARATUS FOR RESOURCE COORDINATION BETWEEN VEHICLE-TO-EVERYTHING DEVICES AND USER EQUIPMENT

CROSS-REFERENCE TO RELATED APPLICATIONS

This application is a continuation of International Application No. PCT/CN2022/087646, filed on Apr. 19, 2022, which claims priority to Chinese Patent Application No. 202110507886.9, filed on May 10, 2021. The disclosures of the aforementioned applications are hereby incorporated by reference in their entireties.

TECHNICAL FIELD

The present disclosure relates to the field of communications technologies, and in particular, to a method and an apparatus for resource coordination between vehicle-to-everything devices, and a user equipment.

BACKGROUND

For user equipments (UE) in a sidelink (sidelink), if there is no scheduling performed by a base station, a UE at a transmit end is mainly used to sense resource occupation status of other UEs to determine a resource occupation status of a system in a future period, and then select an unoccupied resource for a resource transmission service. However, a resource sensing process in the sidelink is prone to be affected by a hidden node, an exposed node, a half-duplex node, and a burst service, thus resulting in adverse impact on a process of determining available resources performed by the UE at the transmit end, and causing cases such as a collision or inappropriate selection of an actually selected transmission resource.

SUMMARY

Embodiments of the present disclosure provide a method and an apparatus for resource coordination between vehicle-to-everything devices, and a user equipment, to solve a problem, in a resource allocation mechanism in a related technology, of inaccurate resource selection due to half-duplex, a hidden node, an exposed node and the like for a user equipment at a receive end.

To solve the foregoing technical problem, the embodiments of the present disclosure provide the following technical solutions.

According to a first aspect, an embodiment of the present disclosure provides an inter-device resource coordination method, applied to a first user equipment, where the method includes:

receiving sidelink control information (SCI) sent by at least one second user equipment, where the SCI includes indication information for triggering resource coordination; and sending coordination information to a target second user equipment, where the coordination information is used to instruct the target second user equipment to perform resource reselection, and the target second user equipment is at least one of the second user equipments.

Optionally, the sending coordination information to a target second user equipment includes:

determining, based on a time-frequency domain location or a time domain location of a data resource indicated in the SCI, second user equipments on which a resource conflict occurs;

determining the target second user equipment from the second user equipments on which a resource conflict occurs; and sending the coordination information to the target second user equipment.

Optionally, the method further includes:

selecting, based on a priority, the target second user equipment from the second user equipments on which a resource conflict occurs.

Optionally, the selecting, based on the priority, the target second user equipment from the second user equipments on which a resource conflict occurs includes any one of the following manners:

determining one or more second user equipments having the highest priority in the second user equipments on which a resource conflict occurs as the target second user equipment;

determining L second user equipments having a higher priority in the second user equipments on which a resource conflict occurs as the target second user equipments, where L is greater than or equal to 1;

determining a second user equipment, in the second user equipments on which a resource conflict occurs, having a priority higher than a first preset priority threshold as the target second user equipment, where the first preset priority threshold is preconfigured or configured by a network;

determining one or more second user equipments having a lower priority in the second user equipments on which a resource conflict occurs as the target second user equipment;

determining L second user equipments having a higher priority in the second user equipments on which a resource conflict occurs as the target second user equipment, where L is greater than or equal to 1; and determining a second user equipment, in the second user equipments on which a resource conflict occurs, having a priority lower than a first preset priority threshold as the target second user equipment, where the first preset priority threshold is preconfigured or configured by a network.

Optionally, a quantity of the target second user equipments is determined based on at least one of the following:

a capability of the first user equipment to simultaneously transmit the coordination information;

a capability of the first user equipment to simultaneously transmit HARQ feedback;

a capability of the first user equipment simultaneously transmits the coordination information and HARQ feedback;

network configuration or pre-configuration; and a maximum transmit power of the first user equipment.

Optionally, in a case that the first user equipment needs to simultaneously transmit the coordination information and hybrid automatic repeat request (HARQ) feedback, determination of the target second user equipment includes any one of the following manners:

preferentially ensuring the HARQ feedback;

preferentially ensuring transmission of the coordination information; and comparing a priority corresponding to the HARQ feedback with a priority corresponding to transmission of the coordination information.

Optionally, the method further includes:

determining a transmission resource location of the coordination information according to a preset association relationship between resource location of the coordination information and a time-frequency domain location occupied by a packet sent by the target second user equipment.

Optionally, the determining a transmission resource location of the coordination information according to a preset association relationship between resource location of the coordination information and a time-frequency domain location occupied by a packet sent by the target second user equipment includes:

determining the transmission resource location of the coordination information based on at least one of the following parameters:

a priority information in the SCI of the target second user equipment;

an index of a frequency domain sub-channel occupied by a packet sent by the target second user equipment;

an index of a time domain resource, occupied by a packet sent by the target second user equipment, in a time domain resource set associated with the coordination information; and a source identity (ID) in the SCI of the target second user equipment.

According to a second aspect, an embodiment of the present disclosure further provides an inter-device resource coordination method, applied to a second user equipment, where the method includes:

sending SCI to a first user equipment, where the SCI includes a priority and indication information for triggering resource coordination.

Optionally, the method further includes:

receiving coordination information sent by the first user equipment, where the coordination information is used to instruct the second user equipment to perform resource reselection or reselection determination on an associated resource.

Optionally, the method further includes any one of the following manners:

performing resource reselection determination based on a resource sensing result of the second user equipment and the coordination information; and excluding all resources in time domain which associated with the coordination information and performing resource reselection.

Optionally, the method further includes:

determining a reception resource location of the coordination information according to a preset association relationship between resource location of the coordination information and a time-frequency domain location occupied by a packet sent by the second user equipment.

Optionally, the determining a reception resource location of the coordination information according to a preset association relationship between resource location of the coordination information and a time-frequency domain location occupied by a packet sent by the second user equipment includes:

determining the reception resource location of the coordination information based on at least one of the following parameters:

a priority information in the SCI of the second user equipment;

an index of a frequency domain sub-channel occupied by a packet sent by the second user equipment;

an index of a time domain resource, occupied by a packet sent by the second user equipment, in a time domain resource set associated with the coordination information; and a source ID in the SCI of the second user equipment.

According to a third aspect, an embodiment of the present disclosure further provides a user equipment, where the user equipment is a first user equipment, including a processor, a memory, and a program or instructions stored in the memory and capable of running on the processor, where when the processor executes the program or the instructions, steps of the inter-device resource coordination method according to the second aspect are implemented.

According to a fourth aspect, an embodiment of the present disclosure further provides a user equipment, where the user equipment is a second user equipment, including a processor, a memory, and a program or instructions stored in the memory and capable of running on the processor, where when the processor executes the program or the instructions, steps of the inter-device resource coordination method according to the second aspect are implemented.

According to a fifth aspect, an embodiment of the present disclosure further provides an inter-device resource coordination apparatus, applied to a first user equipment and including:

a first receiving module, configured to receive SCI sent by at least one second user equipment, where the SCI includes indication information for triggering resource coordination; and a first sending module, configured to send coordination information to a target second user equipment, where the coordination information is used to instruct the target second user equipment to perform resource reselection, and the target second user equipment is at least one of the second user equipments.

Optionally, the first sending module includes:

a first determining unit, configured to determine, based on a time-frequency domain location or a time domain location of a data resource indicated in the SCI, second user equipments on which a resource conflict occurs;

a second determining unit, configured to determine the target second user equipment from the second user equipments on which a resource conflict occurs; and a sending unit, configured to send the coordination information to the target second user equipment.

Optionally, the apparatus further includes:

a selection module, configured to select, based on a priority, the target second user equipment from the second user equipments on which a resource conflict occurs.

Optionally, the selection module includes any one of the following:

a third determining unit, configured to determine one or more second user equipments having the highest priority in the second user equipments on which a resource conflict occurs as the target second user equipment;

a fourth determining unit, configured to determine L second user equipments having a higher priority in the second user equipments on which a resource conflict occurs as the target second user equipments, where L is greater than or equal to 1;

a fifth determining unit, configured to determine a second user equipment, in the second user equipments on which a resource conflict occurs, having a priority higher than a first preset priority threshold as the target second user equipment, where the first preset priority threshold is preconfigured or configured by a network;

a sixth determining unit, configured to determine one or more second user equipments having the lowest priority in the second user equipments on which a resource conflict occurs as the target second user equipment;

a seventh determining unit, configured to determine L second user equipments having a lower priority in the second user equipments on which a resource conflict occurs as the target second user equipments, where L is greater than or equal to 1; and an eighth determining unit, configured to determine a second user equipment, in the second user equipments on which a resource conflict occurs, having a priority lower than a first preset priority threshold as the target second user equipment, where the first preset priority threshold is preconfigured or configured by a network.

Optionally, a quantity of the target second user equipments is determined based on at least one of the following:

a capability of the first user equipment to simultaneously transmit the coordination information;

a capability of the first user equipment to simultaneously transmit HARQ feedback;

a capability of the first user equipment simultaneously transmits the coordination information and HARQ feedback;

network configuration or pre-configuration; and a maximum transmit power of the first user equipment.

Optionally, in a case that the first user equipment needs to simultaneously transmit the coordination information and HARQ feedback, the first determining unit is specifically used in any one of the following manners:

preferentially ensuring the HARQ feedback;

preferentially ensuring transmission of the coordination information; and comparing a priority corresponding to the HARQ feedback with a priority corresponding to transmission of the coordination information.

Optionally, the apparatus further includes:

a first determining module, configured to determine a transmission resource location of the coordination information according to a preset association relationship between resource location of the coordination information and a time-frequency domain location occupied by a packet sent by the target second user equipment.

Optionally, the first determining module includes:

a ninth determining unit, configured to determine the transmission resource location of the coordination information based on at least one of the following parameters:

a priority information in the SCI of the target second user equipment;

an index of a frequency domain sub-channel occupied by a packet sent by the target second user equipment;

an index of a time domain resource, occupied by a packet sent by the target second user equipment, in a time domain resource set associated with the coordination information; and a source ID in the SCI of the target second user equipment.

According to a sixth aspect, an embodiment of the present disclosure further provides an inter-device resource coordination apparatus, applied to a second user equipment and including:

a second sending module, configured to send SCI to a first user equipment, where the SCI includes a priority and indication information for triggering resource coordination.

Optionally, the apparatus further includes:

a second receiving module, configured to receive coordination information sent by the first user equipment, where the coordination information is used to instruct the second user equipment to perform resource reselection or reselection determination on an associated resource.

Optionally, the apparatus further includes any one of the following:

a reselection determining module, configured to perform resource reselection determination based on a resource sensing result of the second user equipment and the coordination information; and a reselection module, configured to: exclude all resources associated with the coordination information in time domain and perform resource reselection.

Optionally, the apparatus further includes:

a second determining module, configured to determine a reception resource location of the coordination information according to a preset association relationship between resource location of the coordination information and a time-frequency domain location occupied by a packet sent by the second user equipment.

Optionally, the second determining module includes:

a tenth determining unit, configured to determine a reception resource location of the coordination information according to at least one of the following parameters:

a priority in the SCI of the second user equipment;

an index of a frequency domain sub-channel occupied by a packet sent by the second user equipment;

an index of a time domain resource, occupied by a packet sent by the second user equipment, in a time domain resource set associated with the coordination information; and a source ID in the SCI of the second user equipment.

According to a seventh aspect, an embodiment of the present disclosure further provides a readable storage medium, where the readable storage medium stores a program or instructions. When a processor executes the program or instructions, steps of the inter-device resource coordination method according to any one of the foregoing aspects are implemented.

Beneficial effects of the present disclosure are as follows:

in the solutions of the present disclosure, a first user equipment receives SCI sent by a second user equipment, where the SCI includes indication information for triggering resource coordination; and the first user equipment sends coordination information to at least one target second user equipment in the second user equipments, where the coordination information is used to instruct the target second user equipment to perform resource reselection, so that the second user equipment may be assisted in resource selection and determination from the side of the first user equipment based on the coordination information, and a process in which the second user equipment subsequently sends a resource is indicated, thereby reducing a probability of a resource selection conflict or inappropriate selection of a resource by the second user equipment, and improving communication quality.

DETAILED DESCRIPTIONS OF THE EMBODIMENTS

To make the technical problems, technical solutions, and advantages to be solved in the present disclosure clearer, the following describes the present disclosure in detail with reference to the accompanying drawings and specific embodiments. In the following description, specific details such as specific configurations and components are provided only to help fully understand the embodiments of the present disclosure. Therefore, a person skilled in the art should understand that various changes and modifications may be made to the embodiments described herein without departing from the scope and spirit of the present disclosure. In addition, for clarity and simplicity, descriptions of known functions and constructions are omitted.

It should be understood that, "one embodiment" and "an embodiment" throughout this specification means that specific features, structures or characteristics related to the embodiments may be included in at least one embodiment of the present disclosure. Therefore, descriptions of "in one embodiment" or "in an embodiment" in various places throughout this specification are not necessarily referring to a same embodiment. In addition, the specific features, structures, or characteristics may be combined in one or more embodiments in any appropriate manner.

In the embodiments of the present disclosure, it should be understood that, sequence numbers of the foregoing processes do not mean execution sequences. The execution sequences of the processes should be determined according to functions and internal logic of the processes, and should not be construed as any limitation on the implementation processes of the embodiments of the present disclosure.

The terms "system" and "network" in this specification may often be used interchangeably.

In the embodiments of the present application, it should be understood that, "B that is corresponding to A" means that B is associated with A, and B may be determined based on A. However, it should also be understood that, determining B based on A does not mean determining B based only on A, but instead B may be determined based on A and/or other information.

Before the embodiments of the present disclosure are described, some concepts in the following descriptions are first explained.

Figure 1:
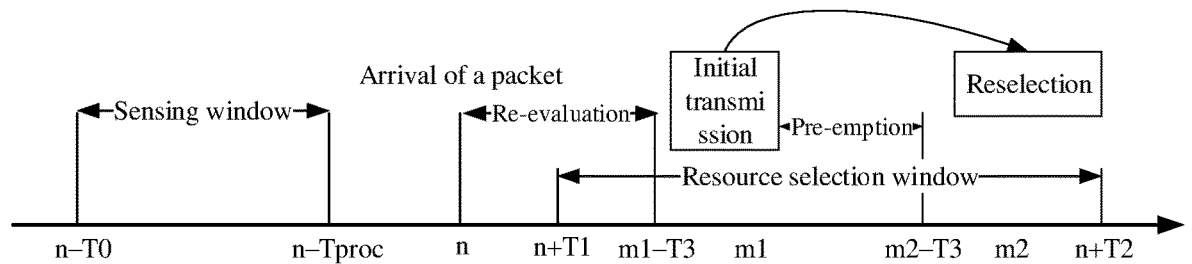
FIG. 1 shows a sequence diagram of resource selection according to the present disclosure.

Information exchange of new radio-vehicle to everything (NR-V2X) uses a sensing and reference signal received power (RSRP)-based resource exclusion technology. Referring to FIG. 1, in a Sensing window, a UE continuously performs receiving and decoding, and measures an RSRP. As shown in FIG. 1, a start time of the Sensing window is n−T0, and an end time of the Sensing window is n−Tproc. When a packet arrives at a time n, a resource selection process of the UE is as follows: (1) According to a sensing result of the UE, a resource reserved in a resource selection window and having a received RSRP greater than an RSRP threshold is excluded from the resource selection window, and the RSRP threshold is determined based on a priority of the received packet and a priority of a packet to be sent. As shown in FIG. 1, a start time of the resource selection window is n+T1, and an end time is n+T2. (2) After resource exclusion is performed, a proportion of available resources is determined. If the proportion of the available resources is less than X % of a total quantity of resources in the resource selection window, the RSRP threshold is increased by 3 dB, and then a process of the resource exclusion in step (1) is repeated until the proportion of the available resources is greater than or equal to X %. (3) The UE randomly selects a required resource from the available resources.

On such a basis, a re-evaluation mechanism and a pre-emption mechanism are added to solve resource collisions caused by a non-periodic burst service and ensure reliability of a high-priority service, respectively. The re-evaluation mechanism is mainly for a resource that is not reserved. Before a resource is sent, it is determined, based on the latest Sensing result, whether a selected resource collides. If a collision has occurred, reselection may be performed, so as to reduce a probability of a resource conflict. The pre-emption mechanism is mainly for a resource that has been reserved. If it is found that the resource that has been reserved is occupied by a high-priority UE, a low-priority UE is triggered to perform resource reselection, so as to avoid collision between a high-priority service and a low-priority service, thereby ensuring performance of the high-priority service. As shown in FIG. 1, an initial transmission time is m1, a reselection time is m2, a start time of re-evaluation is n, an end time of the re-evaluation is m1−T3, a start time of pre-emption is m1, and an end time of the pre-emption is m2-T3.

Figure 2:
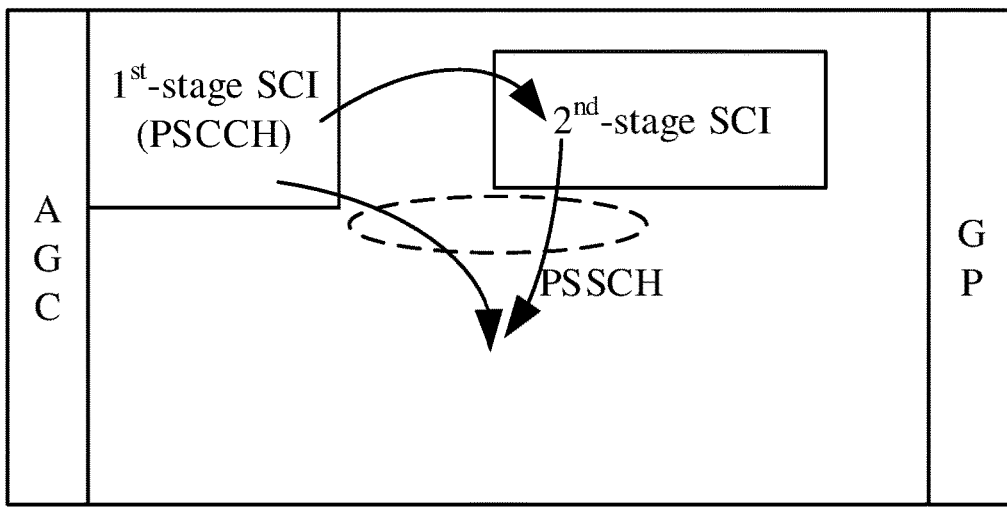
FIG. 2 is a schematic structural diagram 1 of an NR-V2X channel according to the present disclosure.
Figure 3:
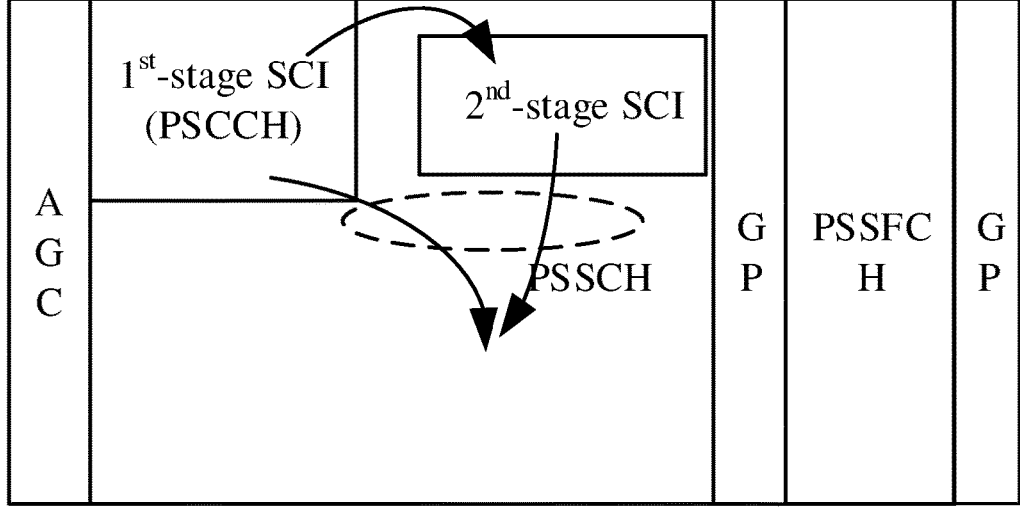
FIG. 3 is a schematic structural diagram 2 of an NR-V2X channel according to the present disclosure.

Channel structures of NR-V2X are shown in FIG. 2 and FIG. 3. A channel of NR-V2X includes a physical sidelink control channel (PSCCH), a physical sidelink shared channel (PSSCH), and a physical sidelink feedback channel (PSFCH). The PSCCH carries $1^{st}$-stage sidelink control information ($1^{st}$-stage SCI), the PSSCH carries $2^{nd}$-stage sidelink control information ($2^{nd}$-stage SCI) and data, and the PSFCH carries feedback information.

The $1^{st}$-stage SCI currently has only one format: SCI format 1-A, which is mainly used to schedule the PSSCH and the $2^{nd}$-stage SCI. The SCI format 1-A includes the following information fields: a priority, frequency resource assignment, time resource assignment, a resource reservation period, a demodulation reference signal pattern (DMRS pattern), a $2^{nd}$-stage SCI format, a beta offset indicator, a number of DMRS ports, a modulation and coding scheme (MCS), an additional MCS table indicator, PSFCH overhead indication, and a reserved bit.

The $1^{st}$-stage SCI implicitly indicates a resource location corresponding to a transmission block (TB) by using a time-frequency domain location of the $1^{st}$-stage SCI, indicates a retransmission location reserved for a current TB by using the frequency resource assignment and the time resource assignment, and indicates a resource location reserved for a next TB by using the resource reservation period. In other words, if a service is periodic, a relative time-frequency domain location in each resource period remains unchanged until transmission of the service completes.

The $2^{nd}$-stage SCI currently has two types of format: SCI format 2-A and SCI format 2-B. The SCI format 2-A is used for PSSCH decoding and an acknowledgement (ACK)/negative acknowledgement (NACK)-based HARQ communication or a NACK-based HARQ communication or a communication without HARQ-ACK, and the SCI format 2-B is used for PSCCH decoding and a NACK-based HARQ communication or a communication without HARQ-ACK.

For the PSFCH, there are two types of feedback modes: one is NACK-based HARQ, which is only for a multicast mode, and all UEs share one PSFCH (only NACK is fed back); and the other is ACK/NACK-based HARQ, which is for a unicast or multicast mode, and each UE uses a separate PSFCH (ACK/NACK is fed back).

The PSFCH mainly uses a sequence-based channel, and each feedback channel occupies two orthogonal frequency division multiplexing (OFDM) symbols in time domain, and occupies a width of one RB in frequency domain. For a generation manner of a base sequence x(n), reference may be made to section 8.3.4.2.1 of the protocol 38.211, which is as follows:

$$x(n) = r_{u,v}^{\alpha,\delta}(n)$$

where u and v determine generation of a base sequence, and $\delta$ determines a length of the sequence. In a sidelink, $\delta=0$, and $\alpha$ determines a cyclic shift used by the sequence. Generally, base sequences used by all Ues in a PSFCH resource pool are generally the same. However, a quantity of cyclic shifts (CS) is configured based on a resource pool, and there may be a configuration of a plurality of CS pairs, which are mainly distinguished by using specific values of two parameters $m_0$, $m_{CS}$. For details, reference may be made to section 16.3 of the protocol 38.213.

$$\alpha_l = \frac{2\pi}{N_{sc}^{RB}}\left(\left(m_0 + m_{cs} + m_{int} + n_{cs}\left(n_{s,f}^\mu, l + l'\right)\right) \bmod N_{sc}^{PB}\right)$$

where $m_{int}$=0, l=0, l' denotes an index, in an entire slot, of the second OFDM symbol in which the PSFCH is transmitted, $$N_{sc}^{RB}$$

denotes a quantity of subcarriers in each RB, $$n_{s,f}^\mu$$

denotes a number of a slot in a radio frame, and $$n_{cs}\left(n_{s,f}^\mu, l + l'\right)$$

is a specific calculation formula. For details, reference may be made to the protocol 38.211. A value of $m_0$ depends on a higher-layer parameter $$N_{CS}^{PSFCH},$$

namely, depending on a quantity of CS pairs used in a current resource pool, as shown in the following Table 1:

TABLE 1

| $N_{CS}^{PSFCH}$ | $m_0$ | | | | | |
| | CS Pair Index 0 | CS Pair Index 1 | CS Pair Index 2 | CS Pair Index 3 | CS Pair Index 4 | CS Pair Index 5 |
|---|---|---|---|---|---|---|
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A value of $m_{CS}$ depends on a feedback type. As shown in Table 2 and Table 3, values are respectively corresponding to two feedback types: ACK/NACK-based feedback and NACK-based feedback.

TABLE 2

| ACK/NACK-based feedback | | |
|---|---|---|
| HARQ-ACK Value | 0 (NACK) | 1 (ACK) |
| Sequence cyclic shift | 0 | 6 |

TABLE 3

| NACK-based feedback | | |
|---|---|---|
| HARQ-ACK Value | 0 (NACK) | 1 (ACK) |
| Sequence cyclic shift | 0 | N/A |

Figure 4:
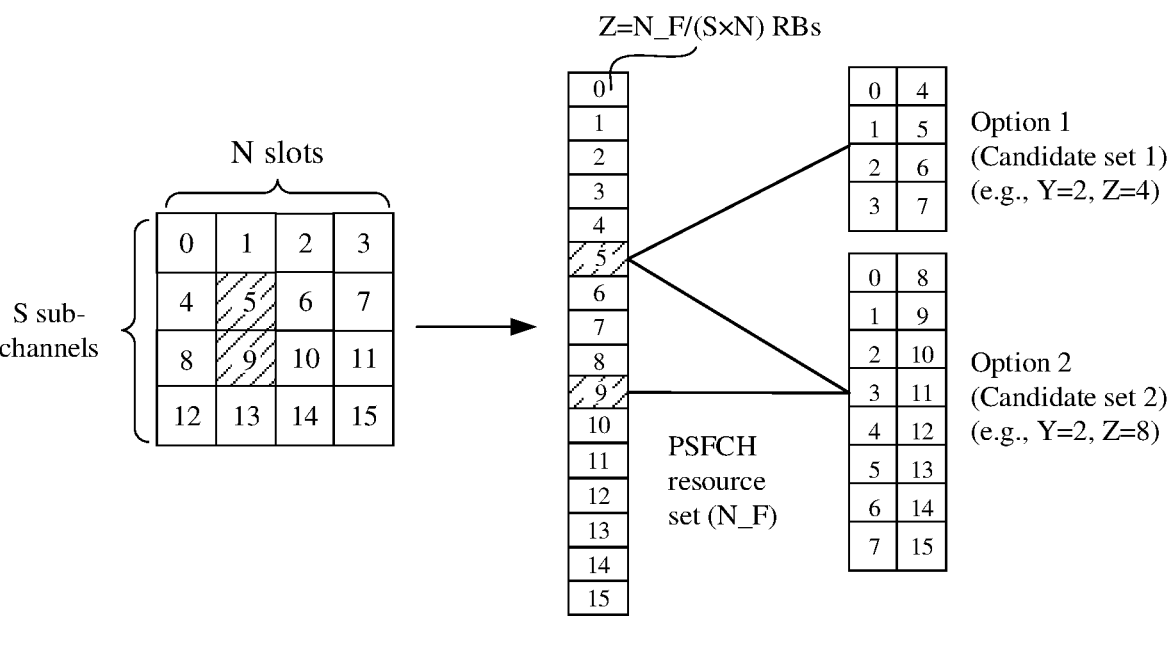
FIG. 4 is a schematic diagram of an implicit mapping of PSFCH candidate resources according to the present disclosure.

A specific PSFCH resource location used for receiving feedback from a UE is determined based on a corresponding PSSCH resource location. There are two solutions for the determining method. Specifically, a resource pool configuration is used to indicate a solution to be used. First, a PSFCH candidate set is determined according to a PSSCH number. Referring to FIG. 4, there are two candidate sets according to a correspondence between a PSFCH candidate resource location and a corresponding PSSCH resource location, that is, Option 1 (candidate set 1) and Option 2 in FIG. 4. After the PSFCH candidate resource set is determined, a resource location PSFCH_index for transmitting the PSFCH needs to be further determined. A specific determining method is as follows:

$$PSFCH\_index = (K + M)\text{Mod}(L * Y)$$

where K is a truncated Layer-2 source ID carried in SCI associated with a PSSCH sent by a TxUE; and values of M are different depending on different modes of HARQ feedback. Specifically, in unicast, M=0; in multicast HARQ feedback Option 1, M=0; and in multicast HARQ feedback Option 2, M is a multicast member ID of a RxUE. In FIG. 4, Z=N_F/(S×N) RBs, where N_F denotes a quantity of PRBs occupied in a PSFCH resource pool, S denotes a quantity of sub-channels in a transmission resource pool, and N denotes a period of the PSFCH (in a unit of slot).

Figure 5:
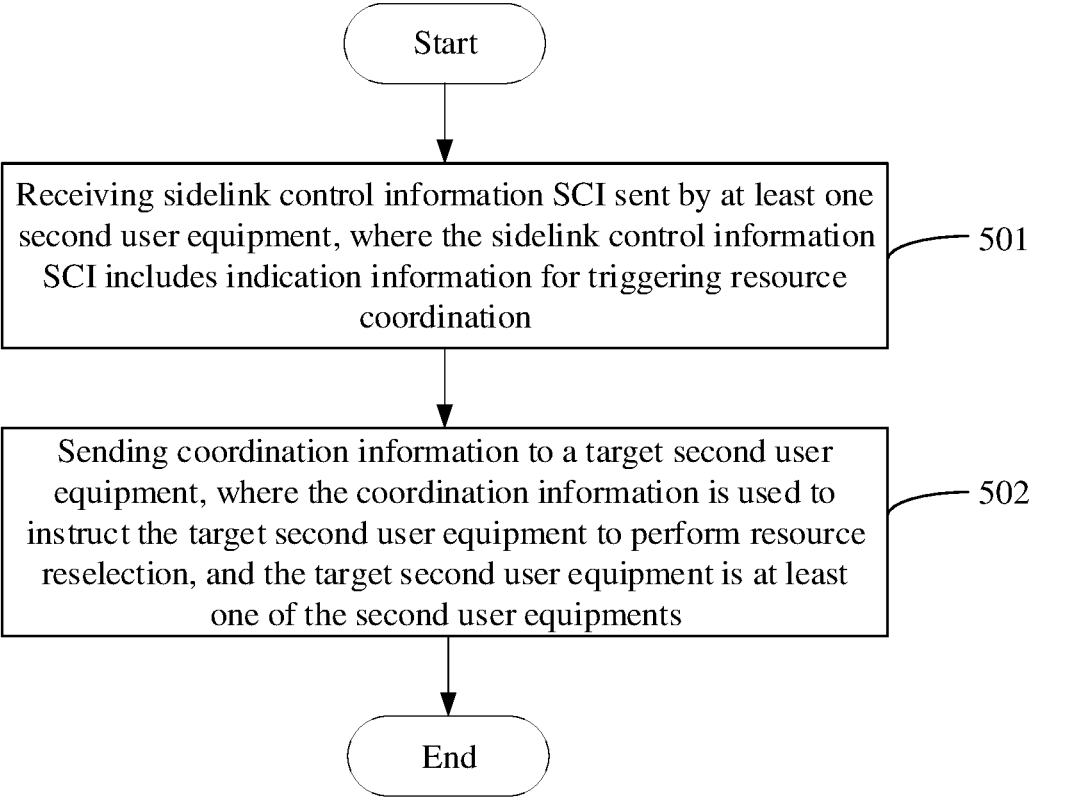
FIG. 5 is a flowchart 1 of an inter-device resource coordination method according to an embodiment of the present disclosure.

As shown in FIG. 5, an embodiment of the present disclosure provides an inter-device resource coordination method, applied to a first user equipment, and the method includes the following steps.

Step 501: Receiving SCI sent by at least one second user equipment, where the SCI includes indication information for triggering resource coordination.

It should be noted that both the first user equipment and the second user equipment in this embodiment of the present disclosure are vehicle-to-everything devices. A blind detection capability of the first user equipment at a single PSCCH candidate resource location is greater than or equal to 2.

Figure 6:
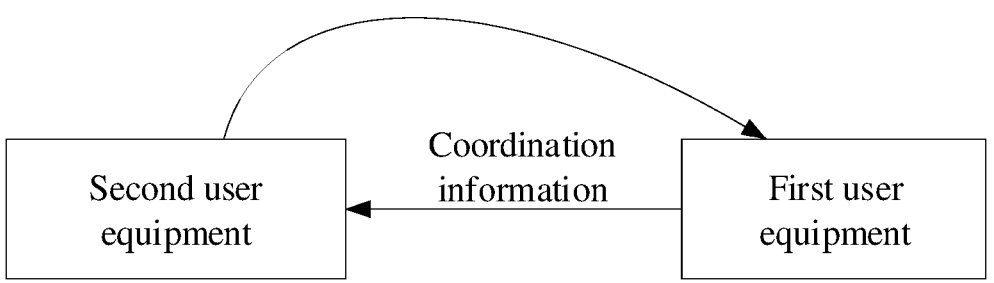
FIG. 6 is a schematic diagram of inter-device information transmission according to an embodiment of the present disclosure.

Referring to FIG. 6, the second user equipment performs data transmission based on information sensed by the second user equipment, where the SCI carries indication information used to trigger resource coordination.

It should be further noted that the first user equipment may be a receiving UE, or may be a third-party UE, and there may be one or more first user equipments. There may be one or more second user equipments.

For a packet sent by the second user equipment, any one of the following in the SCI may be used to perform an indication of triggering resource coordination:

1$^{st}$-stage SCI;

2$^{nd}$-stage SCI;

a newly defined indication field; and reserved bits.

A user equipment that receives the indication information used to trigger resource coordination needs to first confirm whether the user equipment itself is the first user equipment, and a confirmation manner is one of the following:

a user equipment receiving the sending data of the second user equipment is the first user equipment;

a user equipment having a preset capability or configuration is the first user equipment; and a user equipment determined based on a geographical location of the user equipment itself, an RSRP intensity of the second user equipment, or a location in a terminal queue (for example, the user equipment is a head vehicle) is the first user equipment.

In this embodiment of the present disclosure, information may be collected from the side of the first user equipment, so as to assist the second user equipment in resource selection and determination based on the collected information.

Step 502: Sending coordination information to a target second user equipment, where the coordination information is used to instruct the target second user equipment to perform resource reselection, and the target second user equipment is at least one of the second user equipments.

In this embodiment of the present disclosure, the first user equipment sends coordination information to at least one target second user equipment in the second user equipments. The coordination information is used to instruct the target second user equipment to perform resource reselection, so that a process in which the second user equipment subsequently sends a resource may be indicated by the first user equipment based on the coordination information, thereby reducing a probability of a resource selection conflict or inappropriate selection of a resource by the second user equipment, and improving communication quality.

It should be noted that the coordination information is a sequence-based indication, which is similar to a PSFCH, or may be a PSFCH. Preferably, in a manner in which the PSFCH carries the coordination information, a sidelink channel structure in a related technology may not be changed, and no new channel needs to be introduced. The coordination information and the PSFCH may use a same physical resource, or may use different physical resources.

Still referring to FIG. 6, the second user equipment sends SCI to the first user equipment, and the first user equipment sends coordination information to the second user equipment based on indication information carried in the SCI and used to trigger resource coordination.

Optionally, in this embodiment of the present disclosure, the coordination information may also be used to instruct the target second user equipment to perform resource reselection determination based on a sensing result of the target second user equipment, so that the second user equipment may be assisted in resource selection from the side of the first user equipment based on the coordination information.

According to the embodiment of the present disclosure, a first user equipment receives SCI sent by a second user equipment, where the SCI includes indication information for triggering resource coordination; and the first user equipment sends coordination information to at least one target second user equipment in the second user equipments, where the coordination information is used to instruct the target second user equipment to perform resource reselection, so that the second user equipment may be assisted in resource selection and determination from the side of the first user equipment based on the coordination information, and a process in which the second user equipment subsequently sends a resource is indicated, thereby reducing a probability of a resource selection conflict or inappropriate selection of a resource by the second user equipment, and improving communication quality.

Optionally, the sending coordination information to a target second user equipment includes:

determining, based on a time-frequency domain location or a time domain location of a data resource indicated in the SCI, second user equipments on which a resource conflict occurs;

determining the target second user equipment from the second user equipments on which a resource conflict occurs; and sending the coordination information to the target second user equipment.

In this embodiment of the present disclosure, the first user equipment determines, based on the time-frequency domain location or the time domain location of the data resource indicated in the SCI sent by the second user equipment, whether there is a conflict in the data resource sent by the second user equipments. If there is a resource conflict, the second user equipments on which a resource conflict occurs need to be determined, the target second user equipment, namely, a second user equipment that needs feedback through coordination information, is determined from the second user equipments on which a resource conflict occurs, and the coordination information is sent to the target second user equipment.

It may be understood that when the first user equipment detects that a resource conflict occurs between a plurality of second user equipments, where the plurality of second user equipments include a user equipment that has sent indication information used to trigger resource coordination to the first user equipment and a user equipment that does not send indication information used to trigger resource coordination to the first user equipment, the first user equipment sends coordination information only to the user equipment that has sent indication information used to trigger resource coordination.

It should be noted that, a resource conflict may be caused by a resource collision between user equipments or failing to simultaneously transmit and receive data due to half duplex.

Optionally, the method further includes:

selecting, based on a priority, the target second user equipment from the second user equipments on which a resource conflict occurs.

In this embodiment of the present disclosure, it is determined, based on a service priority of a packet included in the SCI, whether to coordinate the second user equipments on which a resource conflict occurs, and perform a coordination indication on the target second user equipment in the second user equipments based on a service priority order of the second user equipments on which a resource conflict occurs.

Based on a procedure for processing feedback of the coordination information by using a service priority, system reliability may be improved, for example, accuracy of transmission of a high-priority service may be ensured, and a possibility of being interfered with by another user equipment may be reduced.

It should be further noted that the first user equipment may alternatively send coordination information to N target second user equipments in the second user equipments on which a resource collision occurs in a random selection manner, where N is a positive integer greater than or equal to 1, and instruct the N target second user equipments to perform resource reselection or resource reselection determination, which is also within the protection scope of the embodiment of the present disclosure.

Optionally, the selecting, based on the service priority, the target second user equipment from the second user equipments on which a resource conflict occurs includes any one of the following manners:

determining one or more second user equipments having the highest priority in the second user equipments on which a resource conflict occurs as the target second user equipment;

determining L second user equipments having a higher priority in the second user equipments on which a resource conflict occurs as the target second user equipments, where L is greater than or equal to 1;

determining a second user equipment, in the second user equipments on which a resource conflict occurs, having a priority higher than a first preset priority threshold as the target second user equipment, where the first preset priority threshold is preconfigured or configured by a network;

determining one or more second user equipments having the lowest priority in the second user equipments on which a resource conflict occurs as the target second user equipment;

determining L second user equipments having a lower priority in the second user equipments on which a resource conflict occurs as the target second user equipments, where L is greater than or equal to 1; and determining a second user equipment, in the second user equipments on which a resource conflict occurs, having a priority lower than a first preset priority threshold as the target second user equipment, where the first preset priority threshold is preconfigured or configured by a network.

In this embodiment of the present disclosure, the first user equipment may select, based on a service priority of each second user equipment, a target second user equipment for transmitting coordination information. The selection manner includes any one of the following, and each manner is specifically described below.

In this embodiment, a smaller value of priority in the SCI indicates a higher corresponding service priority.

For a manner of determining one or more second user equipments having the highest service priority in the second user equipments on which a resource conflict occurs as the target second user equipment, for example, the first user equipment detects that second user equipments on which a conflict has occurred or is about to occur are a UE-B1 and a UE-B2, and the first user equipment compares priority information fields: priority_UE-B1 and priority_UE-B2 in SCI format 1-A in the UE-B1 and the UE-B2. If the first user equipment determines that priority_UE-B 1>priority_UE-B2, indicating that a service priority of the UE-B2 is higher, the UE-B2 having a higher service priority is determined as the target second user equipment. Specifically, it should be further illustrated that, if the first user equipment detects that there are three service priorities in a second user equipment set in which a resource conflict occurs, and each service priority corresponds to at least one second user equipment, where there are three second user equipments corresponding to a first service priority (the service priority is 0), two second user equipments corresponding to a second service priority (the service priority is 1), and two second user equipments corresponding to a third service priority (the service priority is 2), the determining one or more second user equipments having the highest service priority as the target second user equipment indicates that the three second user equipments corresponding to the first service priority (the service priority is 0) are determined as the target second user equipments, and further, the determined target second user equipments having the highest service priority may be instructed to perform resource reselection or reselection determination.

For a manner of determining L second user equipments having a higher priority in the second user equipments on which a resource conflict occurs as the target second user equipments, for example, if the first user equipment detects that there are three service priorities in a plurality of second user equipment sets in which a resource conflict occurs or a resource conflict is about to occur, and each service priority corresponds to at least one second user equipment, where there are two second user equipments corresponding to a first service priority (the service priority is 0), one second user equipment corresponding to a second service priority (the service priority is 1), and four second user equipments corresponding to a third service priority (the service priority is 2), the L second user equipments having a higher priority in the second user equipments are determined as the target user equipments. For example, in this example, when L=3, the two second user equipments corresponding to the first service priority (the service priority is 0) and one second user equipment corresponding to the second service priority (the service priority is 1) are determined as the target second user equipments, and further, the determined target second user equipments having a high service priority may be instructed to perform resource reselection or reselection determination.

For a manner of determining a second user equipment, in the second user equipments on which a resource conflict occurs, having a priority higher than a first preset priority threshold as the target second user equipment, for example, if the first user equipment detects, in a second user equipment set in which a resource conflict occurs or is about to occur, by comparing priority information fields in SCI format 1-A of each second user equipment, that a priority information field of a second user equipment subset (a UE-B1 subset) is less than a first preset priority threshold (priority_thres), that is, priority_UE-B1<priority_thres, the second user equipments included in the UE-B1 subset are the target second user equipments. It needs to be noted that the UE-B1 subset includes one or more second user equipments, and the first preset priority threshold is a service priority threshold used to determine feedback of coordination information, and may be pre-configured or configured by a network, or specifically, may use or be set a same value as a pre-emption threshold in a resource pool configuration. Further, the determined target second user equipments having a high service priority may be instructed to perform resource reselection or reselection determination.

For a manner of determining one or more second user equipments having the lowest priority in the second user equipments on which a resource conflict occurs as the target second user equipment, for example, the first user equipment detects that second user equipments on which a conflict has occurred or is about to occur are a UE-B1 and a UE-B2, and the first user equipment compares priority information fields: priority_UE-B1 and priority_UE-B2 in SCI format 1-A in the UE-B1 and the UE-B2. If the first user equipment determines that priority_UE-B1<priority_UE-B2, indicating that a service priority of the UE-B1 is higher, the UE-B2 having a lower service priority is determined as the target second user equipment. Specifically, it should be further illustrated that, if the first user equipment detects that there are three service priorities in a second user equipment set in which a resource conflict occurs, and each service priority corresponds to at least one second user equipment, where there are three second user equipments corresponding to a first service priority (the service priority is 0), two second user equipments corresponding to a second service priority (the service priority is 1), and two second user equipments corresponding to a third service priority (the service priority is 2), the determining one or more second user equipments having the lowest service priority as the target second user equipment indicates that the two second user equipments corresponding to the third service priority (the service priority is 2) are determined as the target second user equipments. Further, the determined target second user equipments having a low service priority may be instructed to perform resource reselection or reselection determination.

For a manner of determining L second user equipments having a lower priority in the second user equipments on which a resource conflict occurs as the target second user equipments, for example, if the first user equipment detects that there are three service priorities in a plurality of second user equipment sets in which a resource conflict occurs or a resource conflict is about to occur, and each service priority corresponds to at least one second user equipment, where there are two second user equipments corresponding to a first service priority (the service priority is 0), one second user equipment corresponding to a second service priority (the service priority is 1), and four second user equipments corresponding to a third service priority (the service priority is 2), the L second user equipments having a lower priority in the second user equipments are determined as the target user equipments. For example, in this example, when L=5, the four second user equipments corresponding to the third service priority (the service priority is 2) and one second user equipment corresponding to the second service priority (the service priority is 1) are determined as the target second user equipments. Further, the determined target second user equipments having a lower service priority may be instructed to perform resource reselection or reselection determination.

For a manner of determining a second user equipment, in the second user equipments on which a resource conflict occurs, having a priority lower than a first preset priority threshold as the target second user equipment, for example, if the first user equipment detects, in a second user equipment set in which a resource conflict occurs or is about to occur, by comparing priority information fields in SCI format 1-A of each second user equipment, that a priority information field of a second user equipment subset (a UE-B2 subset) is less than a first preset priority threshold (priority_thres), that is, priority_UE-B2>priority_thres, the second user equipments included in the UE-B2 subset are the target second user equipments. It needs to be noted that the UE-B2 subset includes one or more second user equipments, and the first preset priority threshold is a service priority threshold used to determine feedback of coordination information, and may be pre-configured or configured by a network, or specifically, may use or be set a same value as a pre-emption threshold in a resource pool configuration. Further, the determined target second user equipments having a low service priority may be instructed to perform resource reselection or reselection determination.

According to the foregoing three examples in which a second user equipment having a low service priority is determined as the target second user equipment, a user equipment having a low service priority may be instructed to perform resource reselection or reselection determination, so as to ensure accuracy of transmission of a high-priority service.

Optionally, a quantity of the target second user equipments is determined based on at least one of the following:

a capability of the first user equipment to simultaneously transmit the coordination information;

a capability of the first user equipment to simultaneously transmit HARQ feedback;

a capability of the first user equipment simultaneously transmits the coordination information and HARQ feedback;

network configuration or pre-configuration; and a maximum transmit power of the first user equipment.

In this embodiment of the present disclosure, when it is determined that there are a plurality of target second user equipments, a capability to transmit information is constrained by a maximum transmit power and/or transmit capability.

It should be noted that, a capability to simultaneously transmit a quantity of pieces of HARQ feedback information and a capability to simultaneously transmit a quantity of pieces of coordination information may be the same; in other words, only one capability is defined. Alternatively, the HARQ feedback information and the coordination information may be understood as same information or as belonging to a same type of information, and power control processing manners therefor are the same.

When the first user equipment transmits only the coordination information, a quantity of pieces of coordination information that may be actually sent by the first user equipment is jointly determined by a quantity of pieces of coordination information that may be simultaneously sent and a maximum transmit power supported by the first user equipment. A specific transmission method may be to fully reuse a power control method of a PSFCH.

When the first user equipment needs to simultaneously transmit the coordination information and the HARQ feedback information, a quantity of pieces of coordination information and a quantity of pieces of HARQ feedback information that may be actually sent by the first user equipment are jointly determined by a maximum sum of a quantity of pieces of the coordination information and a quantity of pieces of the feedback information that may be both sent and a maximum transmit power supported by the first user equipment, which specifically includes the following cases.

In a case that there is a specific requirement for a transmit power of a single coordination information or a transmit power of a single HARQ feedback information (the transmit power of the coordination information or the transmit power of the HARQ feedback information is obtained based on network configuration or pre-configuration), if a sum of a quantity of pieces of coordination information and a quantity of pieces of HARQ feedback information that need to be sent is less than or equal to a sum x (x is greater than or equal to 1) of a maximum quantity of pieces of coordination information and a maximum quantity of pieces of HARQ feedback information that can be sent by the first user equipment, and a sum of a power for transmitting the coordination information and a power for transmitting the HARQ feedback information does not exceed a maximum transmit power supported by the first user equipment, all pieces of coordination information and HARQ feedback information are transmitted according to a power requirement.

In a case that there is a specific requirement for a transmit power of a single coordination information or a transmit power of a single HARQ feedback information (the transmit power of the coordination information or the transmit power of the HARQ feedback information is obtained based on network configuration or pre-configuration), if a power for transmitting the coordination information and a power for transmitting the HARQ feedback information exceeds a maximum transmit power supported by the first user equipment, the following three cases are specifically included: if transmission of the HARQ feedback information needs to be ensured preferentially, the HARQ feedback information is transmitted preferentially according to a transmit power requirement, and if a maximum power is still not exceeded after all HARQ feedback information is transmitted, the coordination information is further transmitted according to the power requirement until an upper limit of a total quantity of transmissions is reached; if transmission of the coordination information needs to be ensured preferentially, the coordination information is transmitted preferentially according to a transmit power requirement, and if a maximum power is still not exceeded after all coordination information is transmitted, the HARQ feedback information is further transmitted according to the power requirement until an upper limit of a total quantity of transmissions is reached; and according to a transmit power requirement for single information and a maximum transmit power supported by the first user equipment, a maximum quantity of transmissions that may be supported is calculated as y, service priorities of HARQ feedback information to be sent and service priorities corresponding to coordination information to be sent are sorted, y service priorities with the highest service priority are selected in a descending order of service priorities, and y pieces of information corresponding to the y highest service priorities are transmitted, where y is greater than or equal to 1.

Optionally, in a case that the first user equipment needs to simultaneously transmit the coordination information and HARQ feedback, determination of the target second user equipment includes any one of the following manners:

preferentially ensuring the HARQ feedback;

preferentially ensuring transmission of the coordination information; and comparing a priority corresponding to the HARQ feedback with a priority corresponding to transmission of the coordination information.

Continuing to describe the foregoing embodiments, in the case that there is a specific requirement for a transmit power of a single coordination information or a transmit power of a single HARQ feedback information (the transmit power of the coordination information or the transmit power of the HARQ feedback information is obtained based on network configuration or pre-configuration), if a sum of a quantity of pieces of coordination information that needs to be sent and a quantity of HARQ feedback information that needs to be sent is greater than a maximum quantity y of transmissions of the first user equipment, y pieces of coordination information and/or HARQ feedback information are first selected by preferentially ensuring the HARQ feedback, or by preferentially ensuring transmission of the coordination information; or by comparing a priority corresponding to the HARQ feedback with a priority corresponding to transmission of the coordination information, then if a total power for transmitting y pieces of information according to a transmit power requirement does not exceed a maximum transmit power of the first user equipment, the y pieces of information are transmitted according to the transmit power requirement; if a total power for transmitting y pieces of information according to a transmit power requirement exceeds a maximum transmit power of the first user equipment, for a quantity of pieces of information subsequently transmitted and a power control process, a power control procedure related to a PSFCH may be directly reused. The power control procedure is as follows: the first user equipment selects, based on a priority, to send $N_{Tx}$ pieces of coordination information and/or HARQ feedback information, $$N_{Tx} \geq \max\left(1, \sum_{k=1}^{K} M_i\right)$$

where $M_i$ denotes a sum of a quantity of pieces of coordination information and/or a quantity of pieces of HARQ feedback information corresponding to priority value i, and K denotes a maximum value that meets the following condition:

$$P_{one} + 10\log_{10}\left(\max\left(1, \sum_{k=1}^{K} M_i\right)\right) \leq P_{CMAX}$$

where $P_{CMAX}$ denotes a maximum transmit power of the first user equipment, $P_{one}$ denotes a power requirement for transmitting single coordination information or HARQ feedback information, and if K does not meet the foregoing condition, K=0, then $$P_k(i) = \min(P_{CMAX} - 10\log_{10}(N_{Tx}), P_{one})$$

where $P_{CMAX}$ denotes a maximum transmit power of the first user equipment, $P_{one}$ denotes a power requirement for transmitting single coordination information or HARQ feedback information, and $P_k(i)$ [dBin] denotes a power for finally sending single coordination information or HARQ information.

Optionally, that the first user equipment sends HARQ feedback information to a third user equipment and sends feedback coordination information to the second user equipment includes any one of the following manners.

HARQ feedback is preferably ensured. In a case in which the first user equipment still has a capability to feed back coordination information after feeding back the HARQ feedback information to the third user equipment, the first user equipment selects, based on a priority order, a target second user equipment from the second user equipments, and sends the coordination information to the target second user equipment. For example, in a case in which the first user equipment still has a capability to feed back coordination information after feeding back the HARQ feedback information, the first user equipment sends the coordination information to M second user equipments having a highest service priority in the second user equipments, where M is greater than or equal to 1, and a value of M is determined based on a capability of the first user equipment to simultaneously transmit a quantity of pieces of coordination information and/or a quantity of pieces of HARQ feedback information, and a quantity of pieces of HARQ feedback information that needs to be sent.

Transmission of coordination information is preferably ensured. In a case in which the first user equipment still has a capability to feed back HARQ information after sending coordination information to a target second user equipment, the first user equipment selects, based on a priority order, a target third user equipment from the third user equipments, and sends the HARQ information to the target third user equipment. For example, in a case in which the first user equipment still has a capability to feed back HARQ information after sending coordination information to a target second user equipment, the first user equipment sends the HARQ information to N third user equipments having the highest service priority in the third user equipments, where N is greater than or equal to 1, and a value of N is determined based on a capability of the first user equipment to simultaneously transmit a quantity of pieces of coordination information and/or a quantity of pieces of HARQ feedback information, and a quantity of pieces of coordination information that needs to be sent.

A service priority corresponding to the HARQ feedback information is compared with a service priority corresponding to the coordination information. The first user equipment sends, based on an overall priority ranking status and a capability of the first user equipment to send HARQ feedback information and/or coordination information, the coordination information to a target second user equipment, and the HARQ feedback information to the third user equipment. For example, the first user equipment sends, based on a service priority corresponding to the third user equipment that requires feedback of HARQ information and a service priority corresponding to the second user equipment that requires feedback of coordination information and according to a descending order of service priorities, the coordination information and/or the HARQ feedback information to N user equipments having the highest priority, where N is greater than or equal to 1, and a value of N is determined based on a capability of the first user equipment to simultaneously transmit a quantity of pieces of coordination information and/or a quantity of pieces of HARQ feedback information.

It should be further noted that, if there is no requirement for transmit power of single coordination information or HARQ feedback information, the first user equipment determines, based on a total quantity of pieces of coordination information and HARQ feedback information that need to be sent and a maximum supported transmit power and by means of power equalization allocation, a power value used to send each information, and transmits all coordination information and feedback information.

After determining a target second user equipment based on the total quantity of pieces of coordination information and HARQ feedback information that need to be sent and the maximum supported transmit power, the first user equipment sends the coordination information to the target second user equipment, and further instructs the target second user equipment to perform resource reselection or reselection determination.

In this embodiment of the present disclosure, for a case in which the first user equipment may fail to send HARQ feedback information and/or coordination information when the first user equipment needs to receive the HARQ feedback information and/or coordination information, a method for addressing the case is provided as follows. Comparing the highest service priority 1 in a service priority set corresponding to the HARQ feedback information and/or coordination information required to be sent with the highest service priority 2 in a service priority set corresponding to the HARQ feedback information and/or coordination information required to be received, the first user equipment selects to receive/transmit a set corresponding to a higher priority in the highest priority 1 and the highest priority 2.

Optionally, the method further includes:

determining a transmission resource location of the coordination information according to a preset association relationship between resource location of the coordination information and a time-frequency domain location occupied by a packet sent by the target second user equipment.

It should be noted that the association relationship is an implicit association rule, and both a receive end UE and a transmit end UE learn the association relationship.

Optionally, the determining a transmission resource location of the coordination information according to a preset association relationship between resource location of the coordination information and a time-frequency domain location occupied by a packet sent by the target second user equipment includes:

determining a first coordination information time domain resource according to the association relationship, and sending the coordination information on the first coordination information time-frequency domain resource, where the first coordination information time domain resource is located subsequent to a time domain resource occupied by the transmitted packet, and located in a first coordination resource transmission period of which an interval between the first coordination information time domain resource and the time domain resource occupied by the transmitted packet is greater than or equal to a first time interval, and the first time interval is P slots slots; and the coordination information is used to instruct the target second user equipment to perform resource reselection on a resource, in a next service period, corresponding to the resource occupied by the transmitted packet, or is used to instruct the target second user equipment to perform resource reselection on a retransmission resource of the transmitted packet, where P is greater than or equal to 1, a value of P is preconfigured or configured by a network layer, and an available location of a time domain resource of the coordination information is the same as an available location of a time domain resource of the HARQ feedback information.

Figure 7:
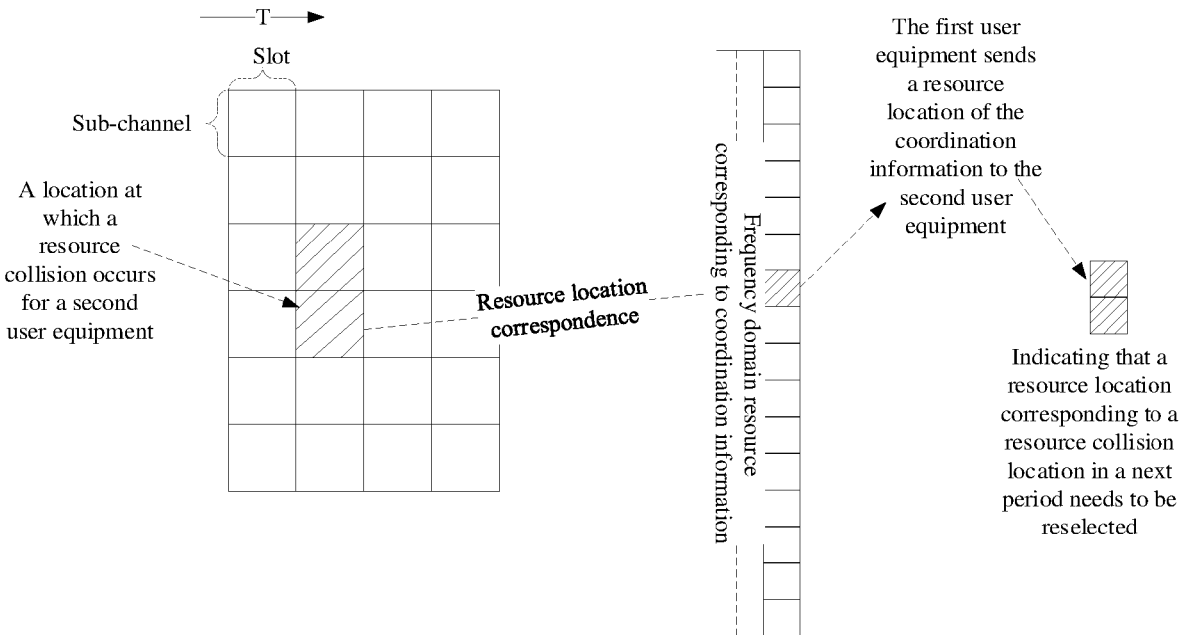
FIG. 7 is a schematic diagram 1 of a mapping location of a coordination resource according to an embodiment of the present disclosure.

In this embodiment of the present disclosure, referring to FIG. 7, in time domain, the first user equipment may select to map coordination information on a coordination information resource transmission period at a first time interval following a resource that has collided. In this case, the coordination information indicates that a resource at a corresponding collision location in a next period needs to be reselected. The first time interval may be one or more coordination information resource transmission periods or the most recent coordination information resource transmission period, or may select a time domain resource same as a time domain resource of HARQ feedback associated with the resource. Optionally, the coordination information may be specifically a PSFCH resource.

Optionally, the determining a frequency domain transmission resource location of the coordination information and a specifically used CS cyclic shift value according to a preset association relationship between resource location of the coordination information and a time-frequency domain location occupied by a packet sent by the target second user equipment includes:

determining the transmission resource location of the coordination information based on at least one of the following parameters:

a priority information in the SCI of the target second user equipment;

an index of a frequency domain sub-channel occupied by a packet sent by the target second user equipment;

an index of a time domain resource, occupied by a packet sent by the target second user equipment, in a time domain resource set associated with the coordination information; and a source ID in the SCI of the target second user equipment.

Figure 8:
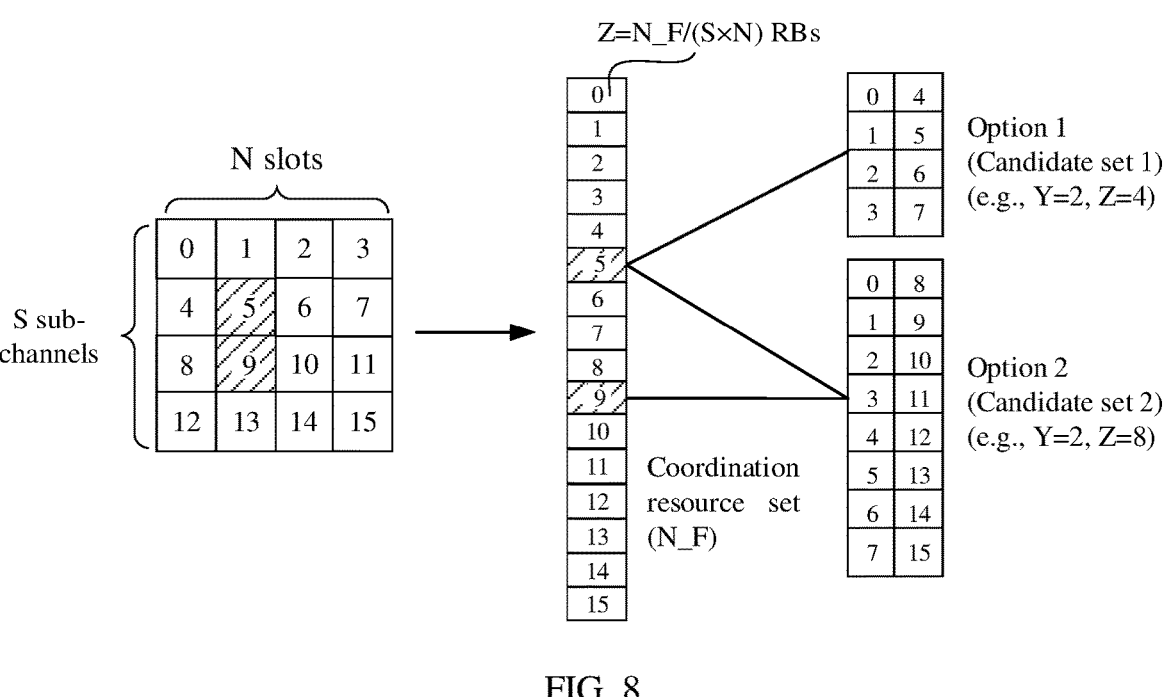
FIG. 8 is a schematic diagram 2 of a mapping location of a coordination resource according to an embodiment of the present disclosure.

In this embodiment of the present disclosure, referring to FIG. 8, in frequency domain, a resource mapping location of coordination information sent by the first user equipment and an association parameter of a used CS cyclic shift include but are not limited to: a frequency domain sub-channel index j (0<=j<S) occupied by a target second user equipment, an index i (0<=i<N) of a slot occupied by a target second user equipment in N PSSCH slot sets that are associated with coordination information, a source ID (or a service priority) of the target second user equipment, and a quantity N_F of RBs that is configured or preconfigured by a higher layer and may be used to transmit coordination information. A determining method is specifically as follows.

First, N_F RBs that may be used to transmit coordination information are equally divided into N*S candidate sub-sets, that is, each candidate sub-set occupies Z RBs, where Z=N_F/(N*S). When sending the coordination information, the first user equipment first determines an RB in a range of [(i+j*N)*Z, (i+1+j*N)*Z−1] in the N_F set for carrying coordination information corresponding to a resource occupied by the target second user equipment and having a time domain index i and a frequency domain index j.

Then, a physical layer source ID (or a service priority) of the target second user equipment, a quantity Z of cyclic shifts pairs available in a resource pool, and N_type are used to determine a specific physical resource occupied by the coordination information in a candidate sub-set. After a candidate resource set of coordination information resources (which may be specifically PSFCH resources) is determined, a resource for transmitting the coordination information needs to be further determined. A specific determining method is as follows:

$$\text{PSFCH\_index} = (K + M)\text{Mod}(Z * Y * \text{N\_type})$$

where PSFCH_index denotes a resource location at which a PSFCH is transmitted, K denotes a truncated Layer-2 source ID (or a priority) carried in SCI associated with a PSSCH sent by the target second user equipment, M=0, Z denotes a quantity of PRBs included in a candidate subset of coordination information, Y denotes a quantity of cyclic shift pairs fed back through ACK/NACK that can be carried in one PRB, and a value of N_type has two possibilities: N_type=1 or N_type=N, which depends on higher layer configuration, where N is a quantity of sub-channels occupied by data of the target second user equipment.

Figure 9:
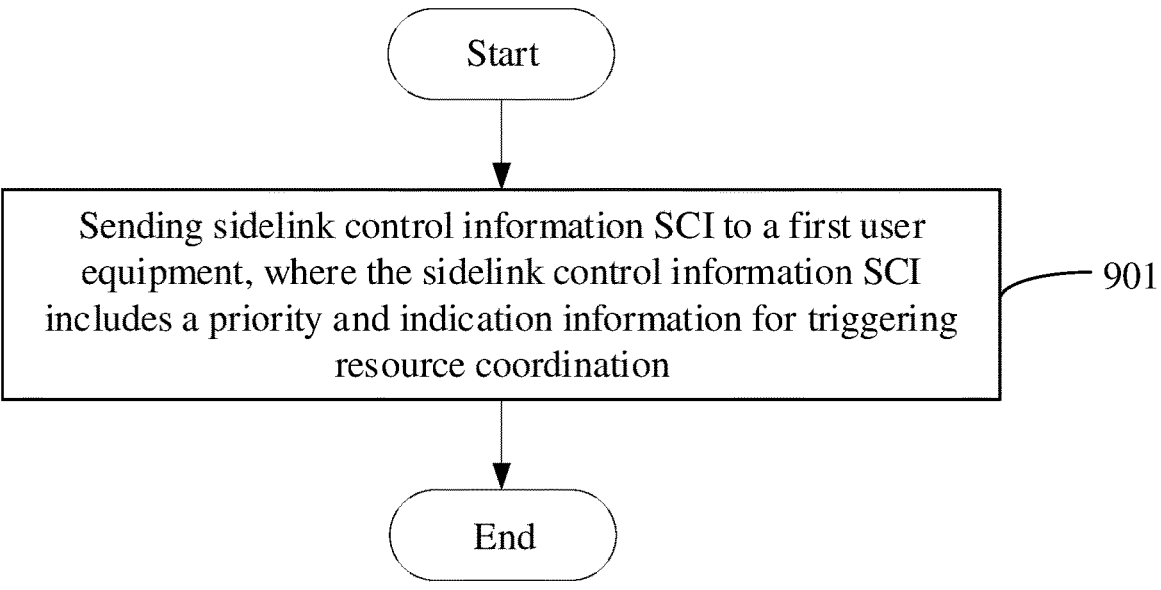
FIG. 9 is a flowchart 2 of an inter-device resource coordination method according to an embodiment of the present disclosure.

As shown in FIG. 9, an embodiment of the present disclosure further provides an inter-device resource coordination method, applied to a second user equipment, and the method includes the following steps.

Step 901: Sending SCI to a first user equipment, where the SCI includes a priority and indication information for triggering resource coordination.

In this embodiment of the present disclosure, referring to FIG. 6, the second user equipment sends SCI to the first user equipment, where the SCI includes a service priority of a packet and indication information used to trigger resource coordination.

In this embodiment of the present disclosure, information is collected from the side of the first user equipment, and the information includes a service priority and indication information for triggering resource coordination, so that the first user equipment may assist the second user equipment in resource selection and determination based on the service priority.

Optionally, the method further includes:

receiving coordination information sent by the first user equipment, where the coordination information is used to instruct the second user equipment to perform resource reselection or reselection determination on an associated resource.

In this embodiment of the present disclosure, still referring to FIG. 6, the second user equipment receives coordination information sent by the first user equipment, where the coordination information is used to instruct the second user equipment to perform resource reselection or reselection determination on the associated resource.

It should be noted that the association resource is an implicit association rule, and both a receive end UE and a transmit end UE learn the association resource. For example, the coordination information correspondingly indicates that a retransmission resource location of a current transmission resource or a transmission resource location reserved for a next period indicated in the SCI sent by the second user equipment needs to be reselected.

Optionally, the method further includes any one of the following manners:

performing resource reselection determination based on a resource sensing result of the second user equipment and the coordination information; and excluding all resources in time domain which associated with the coordination information and performing resource reselection.

In this embodiment of the present disclosure, that the second user equipment performs resource reselection or reselection determination based on the coordination information mainly includes any one of the following manners.

For the second user equipment, after receiving the coordination information, the second user equipment may determine, in combination with a sensing result of the second user equipment itself and the coordination information, whether to perform reselection if a preemption pre-emption function is not configured in a current resource pool; and due to a half-duplex problem or a case that resources with frequency domain occupied in a slot in which a collision occurs are excessive, all resources in a slot associated with the coordination information may be excluded, and then resource reselection is performed.

Optionally, the method further includes:

determining a reception resource location of the coordination information according to a preset association relationship between resource location of the coordination information and a time-frequency domain location occupied by a packet sent by the second user equipment.

It should be noted that the association relationship is an implicit association rule, and both a receive end UE and a transmit end UE learn the association relationship.

Optionally, the determining a reception resource location of the coordination information according to a preset association relationship between resource location of the coordination information and a time-frequency domain location occupied by a packet sent by the second user equipment includes:

determining a first coordination information time domain resource according to the association relationship, and receiving the coordination information on the first coordination information time-frequency domain resource, where the first coordination information time domain resource is located subsequent to a time domain location occupied by the transmitted packet, and located in a first coordination resource transmission period of which an interval between the first coordination information time domain resource and the time domain resource occupied by the transmitted packet is greater than or equal to a first time interval, and the first time interval is P slots slots; and the coordination information is used to indicate that resource reselection is performed for a resource, in a next service period, corresponding to the resource occupied by the transmitted packet, or indicate that resource reselection is performed for a retransmission resource of the transmitted packet, where P is greater than or equal to 1, a value of P is preconfigured or configured by a network layer, and an available location of a time domain resource of the coordination information is the same as an available location of a time domain resource of the HARQ feedback information.

Optionally, the determining a frequency domain transmission resource location of the coordination information and a used CS cyclic shift value according to a preset association relationship between resource location of the coordination information and a time-frequency domain location occupied by a packet sent by the second user equipment includes:

determining the transmission resource location of the coordination information based on at least one of the following parameters:

a priority in the SCI of the second user equipment;

an index of a frequency domain sub-channel occupied by a packet sent by the second user equipment;

an index of a time domain resource, occupied by a packet sent by the second user equipment, in a time domain resource set associated with the coordination information; and a source ID in the SCI of the second user equipment.

Figure 10:
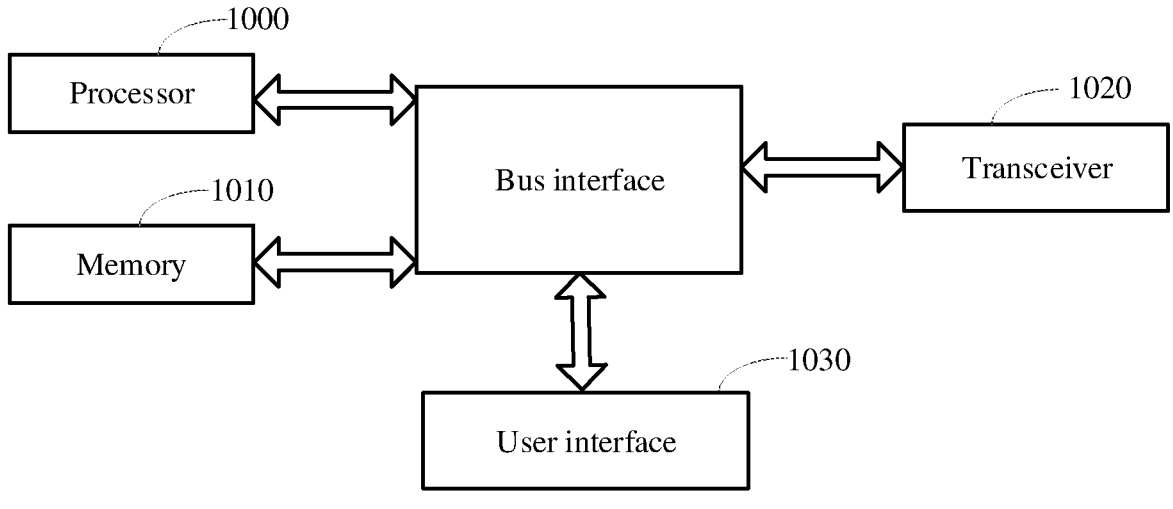
FIG. 10 is a schematic structural diagram 1 of hardware of a user equipment according to an embodiment of the present disclosure.

As shown in FIG. 10, an embodiment of the present disclosure further provides a user equipment, where the user equipment is a first user equipment and includes a processor 1000; and a memory 1010 connected to the processor 1000 by using a bus interface. The memory 1010 is configured to store a program and data that are used when the processor 1000 performs an operation, and the processor 1000 invokes and executes the program and data that are stored in the memory 1010.

The user equipment further includes a transceiver 1020, and the transceiver 1020 is connected to the bus interface and configured to receive and send data under control of the processor 1000. The processor 1000 is configured to read the program in the memory 1010.

Specifically, the transceiver 1020 is configured to receive SCI sent by at least one second user equipment, where the SCI includes indication information for triggering resource coordination; and send coordination information to a target second user equipment, where the coordination information is used to instruct the target second user equipment to perform resource reselection, and the target second user equipment is at least one of the second user equipments.

Optionally, the processor 1000 is configured to: determine, based on a time-frequency domain location or a time domain location of a data resource indicated in the SCI, second user equipments on which a resource conflict occurs, and determine the target second user equipment from the second user equipments on which a resource conflict occurs.

Optionally, the transceiver 1020 sends the coordination information to the target second user equipment.

Optionally, the processor 1000 is further configured to select, based on a priority, the target second user equipment from the second user equipments on which a resource conflict occurs.

Optionally, the processor 1000 is further configured to perform any one of the following:

determining one or more second user equipments having the highest priority in the second user equipments on which a resource conflict occurs as the target second user equipment;

determining L second user equipments having a higher priority in the second user equipments on which a resource conflict occurs as the target second user equipments, where L is greater than or equal to 1;

determining a second user equipment, in the second user
equipments on which a resource conflict occurs, having
a priority higher than a first preset priority threshold as
the target second user equipment, where the first preset
priority threshold is preconfigured or configured by a
network;
determining one or more second user equipments having
the lower priority in the second user equipments on
which a resource conflict occurs as the target second
user equipment;
determining L second user equipments having a lower
priority in the second user equipments on which a
resource conflict occurs as the target second user equip-
ments, where L is greater than or equal to 1; and
determining a second user equipment, in the second user
equipments on which a resource conflict occurs, having
a priority lower than a first preset priority threshold as
the target second user equipment, where the first preset
priority threshold is preconfigured or configured by a
network.

Optionally, a quantity of the target second user equip-
ments is determined based on at least one of the following:
a capability of the first user equipment to simultaneously
transmit the coordination information;
a capability of the first user equipment to simultaneously
transmit HARQ feedback;
a capability of the first user equipment simultaneously
transmits the coordination information and HARQ
feedback;
network configuration or pre-configuration; and
a maximum transmit power of the first user equipment.

Optionally, in a case that the first user equipment needs to
simultaneously transmit the coordination information and
HARQ feedback, determination of the target second user
equipment includes any one of the following manners:
preferentially ensuring the HARQ feedback;
preferentially ensuring transmission of the coordination
information; and
comparing a priority corresponding to the HARQ feed-
back with a priority corresponding to transmission of
the coordination information.

Optionally, the processor 1000 is further configured to
determine a transmission resource location of the coordina-
tion information according to a preset association relation-
ship between resource location of the coordination informa-
tion and a time-frequency domain location occupied by a
packet sent by the target second user equipment.

Optionally, the processor 1000 is further specifically
configured to determine the transmission resource location
of the coordination information based on at least one of the
following parameters:
a priority information in the SCI of the target second user
equipment;
an index of a frequency domain sub-channel occupied by
a packet sent by the target second user equipment;
an index of a time domain resource, occupied by a packet
sent by the target second user equipment, in a time
domain resource set associated with the coordination
information; and
a source ID in the SCI of the target second user equip-
ment.

In FIG. 10, a bus architecture may include any quantity of
interconnected buses and bridges, and specifically intercon-
nect various circuits of one or more processors represented
by the processor 1000 and a memory represented by the
memory 1010. The bus architecture may further intercon-
nect various other circuits such as a peripheral device, a voltage regulator, and a power management circuit. These
are all well known in the art, and therefore are not further
described in this specification. The bus interface provides an
interface. The transceiver 1020 may be a plurality of com-
ponents, including a transmitter and a receiver, and provides
units for communicating with a variety of other apparatuses
on a transmission medium. For different terminals, a user
interface 1030 may also be an interface capable of externally
or internally connecting a required device, and the connected
device includes, but is not limited to, a keypad, a display, a
speaker, a microphone, a joystick, and the like. The proces-
sor 1000 is responsible for management of the bus archi-
tecture and general processing, and the memory 1010 may
store data used when the processor 1000 performs an
operation.

Figure 11:
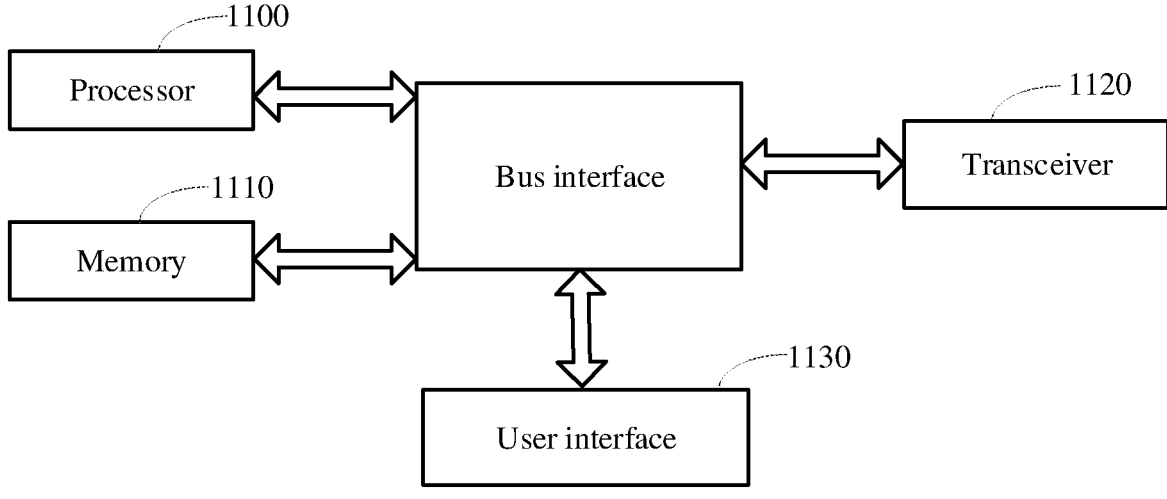
FIG. 11 is a schematic structural diagram 2 of hardware of a user equipment according to an embodiment of the present disclosure.

As shown in FIG. 11, an embodiment of the present
disclosure further provides a user equipment, where the user
equipment is a second user equipment and includes a
processor 1100; and a memory 1110 connected to the
processor 1100 by using a bus interface. The memory 1110
is configured to store a program and data that are used when
the processor 1100 performs an operation, and the processor
1100 invokes and executes the program and data that are
stored in the memory 1110.

The user equipment further includes a transceiver 1120,
and the transceiver 1120 is connected to the bus interface
and configured to receive and send data under control of the
processor 1100. The processor 1100 is configured to read the
program in the memory 1110.

Specifically, the transceiver 1120 is configured to send
SCI to a first user equipment, where the SCI includes a
priority and indication information for triggering resource
coordination.

Optionally, the transceiver 1120 is further configured to
receive coordination information sent by the first user equip-
ment, where the coordination information is used to instruct
a second user equipment to perform resource reselection or
reselection determination on an associated resource.

Optionally, the processor 1100 is configured to perform
any one of the following:
performing resource reselection determination based on a
resource sensing result of the second user equipment
and the coordination information; and
excluding all resources in time domain which associated
with the coordination information and performing
resource reselection.

Optionally, the processor 1100 is further configured to
determine a reception resource location of the coordination
information according to a preset association relationship
between resource location of the coordination information
and a time-frequency domain location occupied by a packet
sent by the second user equipment.

Optionally, the processor 1100 is further specifically con-
figured to determine a transmission resource location of the
coordination information based on at least one of the fol-
lowing parameters:
a priority in the SCI of the second user equipment;
an index of a frequency domain sub-channel occupied by
a packet sent by the second user equipment;
an index of a time domain resource, occupied by a packet
sent by the second user equipment, in a time domain
resource set associated with the coordination informa-
tion; and
a source ID in the SCI of the second user equipment.

In FIG. 11, a bus architecture may include any quantity of
interconnected buses and bridges, and specifically intercon-
nect various circuits of one or more processors represented by the processor 1100 and a memory represented by the memory 1110. The bus architecture may further interconnect various other circuits such as a peripheral device, a voltage regulator, and a power management circuit. These are all well known in the art, and therefore are not further described in this specification. The bus interface provides an interface. The transceiver 1120 may be a plurality of components, including a transmitter and a transceiver, and provides units for communicating with a variety of other apparatuses on a transmission medium. For different terminals, a user interface 1130 may also be an interface capable of externally or internally connecting a required device, and the connected device includes, but is not limited to, a keypad, a display, a speaker, a microphone, a joystick, and the like. The processor 1100 is responsible for management of the bus architecture and general processing, and the memory 1110 may store data used when the processor 1100 performs an operation.

Figures 12, 13:
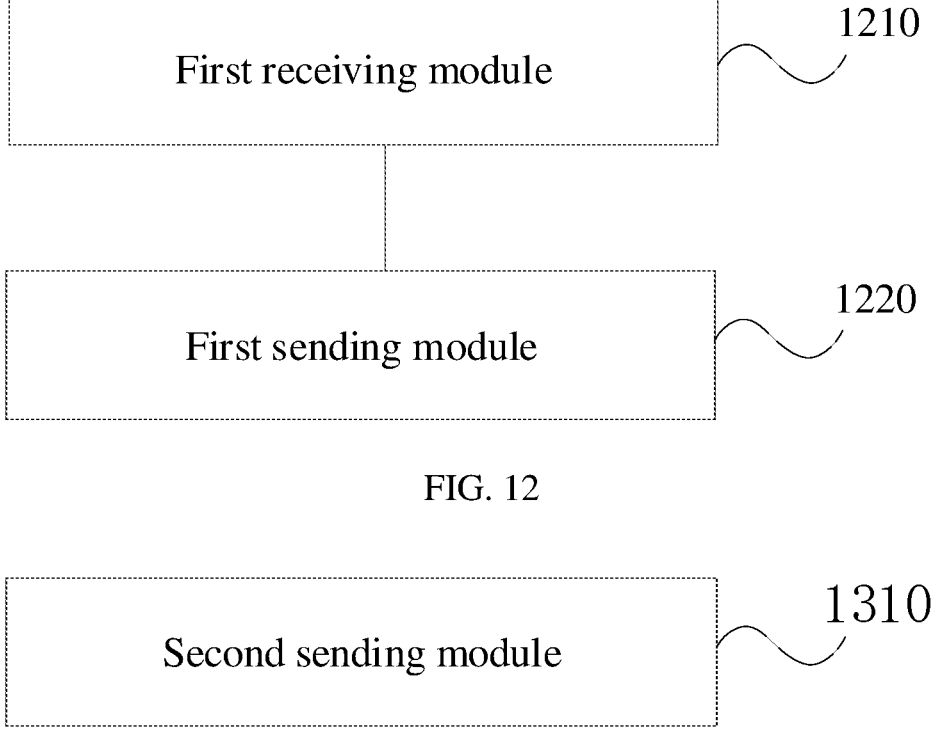
FIG. 12 is a block diagram 1 of an inter-device resource coordination apparatus according to an embodiment of the present disclosure.
FIG. 13 is a block diagram 2 of an inter-device resource coordination apparatus according to an embodiment of the present disclosure.

As shown in FIG. 12, an embodiment of the present disclosure further provides an inter-device resource coordination apparatus, applied to a first user equipment and including:

a first receiving module 1210, configured to receive SCI sent by at least one second user equipment, where the SCI includes indication information for triggering resource coordination; and a first sending module 1220, configured to send coordination information to a target second user equipment, where the coordination information is used to instruct the target second user equipment to perform resource reselection, and the target second user equipment is at least one of the second user equipments.

According to the apparatus provided in the embodiment of the present disclosure, a first user equipment receives SCI sent by a second user equipment, where the SCI includes indication information for triggering resource coordination; and the first user equipment sends coordination information to at least one target second user equipment in the second user equipments, where the coordination information is used to instruct the target second user equipment to perform resource reselection, so that the second user equipment may be assisted in resource selection and determination from the side of the first user equipment based on the coordination information, and a process in which the second user equipment subsequently sends a resource is indicated, thereby reducing a probability of a resource selection conflict or inappropriate selection of a resource by the second user equipment, and improving communication quality.

Optionally, the first sending module 1220 includes:

a first determining unit, configured to determine, based on a time-frequency domain location or a time domain location of a data resource indicated in the SCI, second user equipments on which a resource conflict occurs;

a second determining unit, configured to determine the target second user equipment from the second user equipments on which a resource conflict occurs; and a sending unit, configured to send the coordination information to the target second user equipment.

Optionally, the apparatus further includes:

a selection module, configured to select, based on a priority, the target second user equipment from the second user equipments on which a resource conflict occurs.

Optionally, the selection module includes any one of the following:

a third determining unit, configured to determine one or more second user equipments having the highest priority in the second user equipments on which a resource conflict occurs as the target second user equipment;

a fourth determining unit, configured to determine L second user equipments having a higher priority in the second user equipments on which a resource conflict occurs as the target second user equipments, where L is greater than or equal to 1;

a fifth determining unit, configured to determine a second user equipment, in the second user equipments on which a resource conflict occurs, having a priority higher than a first preset priority threshold as the target second user equipment, where the first preset priority threshold is preconfigured or configured by a network;

a sixth determining unit, configured to determine one or more second user equipments having the lowest priority in the second user equipments on which a resource conflict occurs as the target second user equipment;

a seventh determining unit, configured to determine L second user equipments having a lower priority in the second user equipments on which a resource conflict occurs as the target second user equipments, where L is greater than or equal to 1; and an eighth determining unit, configured to determine a second user equipment, in the second user equipments on which a resource conflict occurs, having a priority lower than a first preset priority threshold as the target second user equipment, where the first preset priority threshold is preconfigured or configured by a network.

Optionally, a quantity of the target second user equipments is determined based on at least one of the following:

a capability of the first user equipment to simultaneously transmit the coordination information;

a capability of the first user equipment to simultaneously transmit HARQ feedback;

a capability of the first user equipment simultaneously transmits the coordination information and HARQ feedback;

network configuration or pre-configuration; and a maximum transmit power of the first user equipment.

Optionally, in a case that the first user equipment needs to simultaneously transmit the coordination information and HARQ feedback, the first determining unit is specifically used in any one of the following manners:

preferentially ensuring the HARQ feedback;

preferentially ensuring transmission of the coordination information; and comparing a priority corresponding to the HARQ feedback with a priority corresponding to transmission of the coordination information.

Optionally, the apparatus further includes:

a first determining module, configured to determine a transmission resource location of the coordination information according to a preset association relationship between resource location of the coordination information and a time-frequency domain location occupied by a packet sent by the target second user equipment.

Optionally, the first determining module includes:

a ninth determining unit, configured to determine the transmission resource location of the coordination information based on at least one of the following parameters:

a priority information in the SCI of the target second user equipment;

an index of a frequency domain sub-channel occupied by a packet sent by the target second user equipment;

an index of a time domain resource, occupied by a packet sent by the target second user equipment, in a time domain resource set associated with the coordination information; and a source ID in the SCI of the target second user equipment.

It should be noted that, the inter-device resource coordination apparatus provided in this embodiment of the present disclosure is an apparatus that can perform the foregoing inter-device resource coordination method applied to the first user equipment. Therefore, all embodiments of the foregoing inter-device resource coordination method applied to the first user equipment are applicable to the apparatus, and can achieve a same or similar technical effect.

As shown in FIG. 13, an embodiment of the present disclosure further provides an inter-device resource coordination apparatus, applied to a second user equipment and includes:

a second sending module 1310, configured to send SCI to a first user equipment, where the SCI includes a priority and indication information for triggering resource coordination.

According to the apparatus provided in this embodiment of the present disclosure, information is collected from the side of the first user equipment. The information includes a service priority and indication information for triggering resource coordination, so that the first user equipment may assist the second user equipment in resource selection and determination based on the service priority.

Optionally, the apparatus further includes:

a second receiving module, configured to receive coordination information sent by the first user equipment, where the coordination information is used to instruct the second user equipment to perform resource reselection or reselection determination on an associated resource.

Optionally, the apparatus further includes any one of the following:

a reselection determining module, configured to perform resource reselection determination based on a resource sensing result of the second user equipment and the coordination information; and a reselection module, configured to: exclude all resources associated with the coordination information in time domain and perform resource reselection.

Optionally, the apparatus further includes:

a second determining module, configured to determine a reception resource location of the coordination information according to a preset association relationship between resource location of the coordination information and a time-frequency domain location occupied by a packet sent by the second user equipment.

Optionally, the second determining module includes:

a tenth determining unit, configured to determine a reception resource location of the coordination information according to at least one of the following parameters:

a priority in the SCI of the second user equipment;

an index of a frequency domain sub-channel occupied by a packet sent by the second user equipment;

an index of a time domain resource, occupied by a packet sent by the second user equipment, in a time domain resource set associated with the coordination information; and a source ID in the SCI of the second user equipment.

It should be noted that, the inter-device resource coordination apparatus provided in this embodiment of the present disclosure is an apparatus that can perform the foregoing inter-device resource coordination method applied to the second user equipment. Therefore, all embodiments of the foregoing inter-device resource coordination method applied to the second user equipment are applicable to the apparatus, and can achieve a same or similar technical effect.

An embodiment of the present disclosure further provides a readable storage medium, where the readable storage medium stores a program or instructions. When a processor executes the program or instructions, steps of the inter-device resource coordination method according to any one of the foregoing aspects are implemented.

In addition, it should be noted that, in the apparatus and method of the present disclosure, it is obvious that each component or step may be decomposed and/or recombined. The decomposition and/or the recombination shall be considered equivalent solutions to the present disclosure. In addition, the steps for performing the foregoing series of processing may be performed in a chronological order as described, but do not necessarily need to be performed in a chronological order, and some of the steps may be performed in parallel or independently of one another. A person of ordinary skill in the art can understand that all or any of the steps or components of the methods and apparatuses of the present disclosure may be implemented in any computing apparatus (including a processor, a storage medium, or the like) or a network of a computing apparatus by using hardware, firmware, software, or a combination thereof, which can be implemented by a person of ordinary skill in the art by using their basic programming skills when reading the description of the present disclosure.

Therefore, the objectives of the present disclosure may also be achieved by running a program or a group of programs on any computing apparatus. The computing apparatus may be a well-known general apparatus. Therefore, the objectives of the present disclosure may also be achieved by providing only a program product including program code for implementing the methods or apparatuses. In other words, such a program product is also included in the present disclosure, and a storage medium that stores such a program product is also included in the present disclosure. Obviously, the storage medium may be any well-known storage medium or any storage medium developed in the future. It should also be noted that in the apparatuses and methods of the present disclosure, it is obvious that each component or step may be decomposed and/or recombined. The decomposition and/or the recombination shall be considered equivalent solutions to the present disclosure. In addition, the steps for performing the foregoing series of processing may be performed in a chronological order as described, but do not necessarily need to be performed in a chronological order. Some of the steps may be performed in parallel or independently of one another.

It should be noted that the foregoing module division is merely a logical function division. In actual implementation, all or a part of the modules may be integrated into one physical entity, or may be physically separated. In addition, these modules may be implemented in a form of software invoked by a processing element; or may be all implemented in a form of hardware; or some modules may be implemented in a form of software invoked by a processing element, and some modules may be implemented in a form of hardware. For example, the modules may be separately disposed processing elements, or may be integrated into a chip of the foregoing apparatus for implementation. In addition, the modules may be stored in a memory of the foregoing apparatus in a form of program code, and a processing element of the foregoing apparatus invokes the program code and executes a function of the determining module. An implementation of another module is similar. In addition, all or a part of the modules may be integrated together, or may be independently implemented. The processing element herein may be an integrated circuit having a signal processing capability. In an implementation process, the steps in the foregoing methods or the foregoing modules may be completed by an integrated logic circuit of hardware in the processor element or instructions in a form of software.

For example, modules, units, subunits, or submodules may be configured to implement one or more integrated circuits in the foregoing methods, for example, one or more application specific integrated circuits (ASIC), or one or more digital signal processors (DSP), or one or more field programmable gate arrays (FPGA), or the like. For another example, when a module is implemented in the form of program code being scheduled by a processing element, the processing element may be a general-purpose processor, for example, a central processing unit (CPU) or another processor capable of invoking the program code. For another example, these modules may be integrated together and implemented in a form of a system-on-a-chip (SOC).

The foregoing descriptions are merely the preferred implementations of the present disclosure. It should only be noted that those of ordinary skill in the art may further make various improvements and modifications without departing from the principles of the present disclosure, and these improvements and modifications also fall within the protection scope of the present disclosure.

What is claimed is:

1. An inter-device resource coordination method, applied to a first user equipment (UE), comprising:
 receiving sidelink control information (SCI) sent by at least one second UE, wherein the SCI comprises indication information for triggering resource coordination; and
 sending coordination information to a target second UE, wherein the coordination information is used to instruct the target second UE to perform resource reselection, and the target second UE is at least one of the at least one second UE,
 wherein the sending the coordination information to the target second UE comprises:
 determining, based on a time-frequency domain location or a time domain location of a data resource indicated in the SCI, one or more UEs on which a resource conflict occurs, wherein the one or more UEs on which the resource conflict occurs comprise a UE that has sent the indication information to the first UE and a UE that does not send the indication information to the first UE;
 determining the target second UE from the one or more UEs on which a resource conflict occurs, wherein the target second UE is the UE that has sent the indication information to the first UE; and
 sending the coordination information only to the target second UE;
 wherein a quantity of transmissions of the coordination information is determined based on:
 a capability of the first UE simultaneously transmits the coordination information and HARQ feedback; and
 a maximum transmit power of the first UE.

2. The inter-device resource coordination method according to claim 1, further comprising:
 selecting, based on a priority, the target second UE from the one or more UEs on which a resource conflict occurs.

3. The inter-device resource coordination method according to claim 2, wherein the selecting, based on a priority, the target second UE from the one or more UEs on which a resource conflict occurs comprises any one of the following manners:
 determining one or more UEs having the lowest priority in the one or more UEs on which a resource conflict occurs as the target second UE;
 determining L UEs having a lower priority in the one or more UEs on which a resource conflict occurs as the target second UE, wherein L is greater than or equal to 1; and
 determining a UE, in the one or more UEs on which a resource conflict occurs, having a priority lower than a first preset priority threshold as the target second UE, wherein the first preset priority threshold is preconfigured or configured by a network.

4. The inter-device resource coordination method according to claim 1, wherein in a case that the first UE needs to simultaneously transmit the coordination information and HARQ feedback, determination of a quantity of transmissions of the coordination information transmitted comprises any one of the following manners:
 transmission of the HARQ feedback has a higher priority than transmission of the coordination information;
 transmission of the coordination information has a higher priority than transmission of the HARQ feedback; and
 comparing a priority corresponding to the HARQ feedback with a priority corresponding to transmission of the coordination information.

5. The inter-device resource coordination method according to claim 1, further comprising:
 determining a transmission resource location of the coordination information according to a preset relationship between resource location of the coordination information and a time-frequency domain location occupied by a packet sent by the target second UE.

6. The inter-device resource coordination method according to claim 5, wherein the determining a transmission resource location of the coordination information according to a preset relationship between resource location of the coordination information and a time-frequency domain location occupied by a packet sent by the target second UE comprises:
 determining the transmission resource location of the coordination information based on at least one of the following parameters:
 a priority in the SCI of the target second UE;
 an index of a frequency domain sub-channel occupied by a packet sent by the target second UE;
 an index of a time domain resource, occupied by a packet sent by the target second UE, in a time domain resource set associated with the coordination information; and
 a source identity (ID) in the SCI of the target second UE.

7. An inter-device resource coordination method, applied to a second user equipment (UE), comprising:
 sending sidelink control information (SCI), wherein the SCI comprises a priority and indication information for triggering resource coordination; and
 receiving coordination information sent by a first UE, wherein the coordination information is used to instruct the second UE to perform resource reselection on an associated resource, wherein the second UE is one of one or more UEs on which a resource conflict occurs determined by the first UE based on a time-frequency domain location or a time domain location of a data resource indicated in the SCI, wherein the one or more UEs on which the resource conflict occurs comprise a UE that has sent the indication information to the first UE and a UE that does not send the indication information to the first UE; the coordination information is sent only to the UE that has sent the indication information to the first UE;

wherein a quantity of transmissions of the coordination information is determined based on:

a capability of the first UE simultaneously transmits the coordination information and HARQ feedback; and a maximum transmit power of the first UE.

8. The inter-device resource coordination method according to claim 7, further comprising any one of:

performing resource reselection determination based on a resource sensing result of the second UE and the coordination information; and excluding all resources in time domain which associated with the coordination information and performing resource reselection.

9. The inter-device resource coordination method according to claim 7, further comprising:

determining a reception resource location of the coordination information according to a preset relationship between resource location of the coordination information and a time-frequency domain location occupied by a packet sent by the second UE.

10. The inter-device resource coordination method according to claim 9, wherein the determining a reception resource location of the coordination information according to a preset relationship between resource location of the coordination information and a time-frequency domain location occupied by a packet sent by the second UE comprises:

determining the reception resource location of the coordination information based on at least one of the following parameters:

a priority information in the SCI of the second UE;

an index of a frequency domain sub-channel occupied by a packet sent by the second UE;

an index of a time domain resource, occupied by a packet sent by the second UE, in a time domain resource set associated with the coordination information; and a source identity (ID) in the SCI of the second UE.

11. A user equipment (UE), wherein the UE is a first UE, comprising a processor, a memory, and a program or instructions stored in the memory and capable of running on the processor, wherein when the processor executes the program or the instructions, steps of the inter-device resource coordination method according to claim 1 are implemented.

12. A user equipment (UE), wherein the UE is a second UE, comprising a processor, a memory, and a program or instructions stored in the memory and capable of running on the processor, wherein when the processor executes the program or the instructions, steps of the inter-device resource coordination method according to claim 7 are implemented.

13. A non-transitory readable storage medium, wherein the non-transitory readable storage medium stores a program or instructions, and when a processor executes the program or instructions, steps of the inter-device resource coordination method according to claim 1 are implemented.

14. A non-transitory readable storage medium, wherein the non-transitory readable storage medium stores a program or instructions, and when a processor executes the program or instructions, steps of the inter-device resource coordination method according to claim 7 are implemented.

\* \* \* \* \*